(12) United States Patent
Ryan et al.

(10) Patent No.: US 10,848,347 B2
(45) Date of Patent: Nov. 24, 2020

(54) MANAGING VIRTUAL LOCAL AREA NETWORK DOMAINS

(75) Inventors: James Ryan, Littleton, CO (US);
Marcus Hadavi, Denver, CO (US);
Michael Renner, Englewood, CO (US);
Jerry Cox, Westminster, CO (US);
James Dwyer, Dallas, TX (US)

(73) Assignee: Level 3 Communications, LLC, Broomfield, CO (US)

( * ) Notice: Subject to any disclaimer, the term of this patent is extended or adjusted under 35 U.S.C. 154(b) by 2197 days.

(21) Appl. No.: 12/970,930

(22) Filed: Dec. 16, 2010

(65) Prior Publication Data

US 2011/0149800 A1 Jun. 23, 2011

Related U.S. Application Data

(63) Continuation-in-part of application No. 11/849,010, filed on Aug. 31, 2007.

(51) Int. Cl.
*H04L 12/28* (2006.01)
*H04L 12/46* (2006.01)
*H04L 12/24* (2006.01)

(52) U.S. Cl.
CPC ........ *H04L 12/467* (2013.01); *H04L 41/0806* (2013.01)

(58) Field of Classification Search
None
See application file for complete search history.

(56) References Cited

U.S. PATENT DOCUMENTS 5,751,967 A  5/1998 Raab et al.
6,073,140 A  6/2000 Morgan et al.
(Continued)

FOREIGN PATENT DOCUMENTS

EP  1249966 A2  10/2002
JP  00165430  6/2000
JP  05333546  12/2005

OTHER PUBLICATIONS

"International Searching Authority", Korean Intellectual Property Office, International Search Report (Form PCTIISAI220) for international application No. PCT/USOBI063700, International Filing Date: May 15, 200B, 6 Pages.

(Continued)

*Primary Examiner* — Steve R Young

(57) ABSTRACT

In one embodiment, a computer-implemented method of managing a virtual local area network (VLAN) domain associated with a network is provided. In this embodiment, the method comprises: defining a VLAN domain comprising a list of a plurality of connectively coupled ports of the network associated with the VLAN domain; and assigning at least one VLAN associated with the plurality of connectively coupled ports. In another embodiment, a system for managing virtual local area networks (VLANs) in a network is provided. In this embodiment, the system comprises a network provisioning module for defining a VLAN domain comprising a list of a plurality of connectively coupled ports of the network associated with the VLAN domain and assigning at least one VLAN associated with the plurality of connectively coupled ports. The system further comprises a a network monitoring system operable to gather actual network element configuration data from a plurality of network elements associated with one or more VLAN domains, wherein the actual network element configuration data identifies one or more VLANs that at least some of the plurality of network elements are actually allocated to; and a VLAN services module operable to correlate the actual network element configuration data with administrative VLAN data. The administrative VLAN data identifies one or more VLANs recognized by a business process. In one particular embodiment, the system is further operable to determine one or more VLANs that are not commonly (Continued)

identified in both the actual network element configuration data and the administrative VLAN data.

19 Claims, 23 Drawing Sheets

(56) References Cited

U.S. PATENT DOCUMENTS

| | | | | |
|---|---|---|---|---|
| 6,167,052 | A * | 12/2000 | McNeill | H04L 12/1886 370/399 |
| 7,184,942 | B2 | 2/2007 | Graves | |
| 7,391,719 | B2 | 6/2008 | Ellis | |
| 9,454,294 | B2 | 9/2016 | Sapuram | |
| 10,205,638 | B1 * | 2/2019 | Angrish | H04L 41/22 |
| 2001/0005849 | A1 | 6/2001 | Boothby et al. | |
| 2004/0042416 | A1 * | 3/2004 | Ngo et al. | 370/254 |
| 2004/0044754 | A1 * | 3/2004 | Virdy | H04L 12/462 709/223 |
| 2004/0249916 | A1 * | 12/2004 | Graves | H04L 12/4675 709/223 |
| 2006/0007939 | A1 * | 1/2006 | Elangovan | H04L 12/465 370/395.53 |
| 2006/0013158 | A1 * | 1/2006 | Ahuja | H04L 12/4641 370/328 |
| 2006/0200455 | A1 | 9/2006 | Wilson | |
| 2007/0110028 | A1 | 5/2007 | Wu | |
| 2011/0080915 | A1 * | 4/2011 | Baykal | H04L 12/4641 370/395.53 |
| 2016/0149758 | A1 * | 5/2016 | Kinoshita | H04L 41/0896 709/220 |

OTHER PUBLICATIONS

"International Searching Authority", Korean Intellectual Property Office, Written Opinion of the International Searching Authority (Form PCT/ISA/237) for international application No. PCT/US OB/063700,International Filino Date: May 15, 2008 , 5 pages.

Canadian Examination Report, dated Sep. 4, 2012, Application No. 2697769, 6 pgs.

Extended European Search Report, dated Apr. 23, 2013, EP Application No. 08755533.0, 6 pgs.

Canada Examination Report, dated Nov. 22, 2013, Application No. 2,697,769, filed May 15, 2008, 3 pgs.

European Examination Report, dated Mar. 15, 2016, Application No. 08755533.0, filed May 15, 2008; 11 pgs.

Canadian Examination Report, dated Mar. 11, 2015, Application No. 2,697,769, filed May 15, 2008; 5 pgs.

* cited by examiner

| VLAN TOOL | | | | | | |
|---|---|---|---|---|---|---|
| File  Search  Help | | | | | | |

VLAN STATES – ALL VLANS

| Vlan | Domain | Source | Device | Port | SCID | Cust. |
|---|---|---|---|---|---|---|
| 0 | Boston1 | Reserv. | | | | |
| 1 | | IPNMS | car1.bos1 | Device | No Data | |
| 1 | | IPNMS | car2.bos1 | Device | No Data | |
| 1 | | IPNMS | mcd1.bos1 | Device | No Data | |
| 1 | Boston1 | IPNMS | mgd1.bos1 | Device | No Data | |
| 1 | Boston1 | Blocked | | | | |
| 1 | Boston1 | IPNMS | car1.bos1 | GbEthnt6/3 | IL\|ipco-sw2\|3/1 | |
| 1 | Boston1 | IPNMS | car1.bos1 | GbEthnt6/4 | IL\|ipco-sw2\|4/7 | |
| 1 | Boston1 | IPNMS | car1.bos1 | GbEthnt6/5 | IL\|ipco-sw2\|3/6 | |
| 1 | Boston1 | IPNMS | car1.bos1 | GbEthnt6/7 | IL\|dial.ge1\|ge2\|... | |

VD By Domain | Orphan Ports
VD by Gateway
- ∩ Atl1
- ∩ Atl2
- ∩ Atl3
- ∩ Bos1
  - 23114A/ETHERNET
  - Boston1
- ∩ Bos2
- ∩ Bos3
- ∩ Bos6

VLAN TOOL

File  Search  Help

☐ ☐ ☐ ☐

| VD By Domain | Orphan Ports |
|---|---|
| VD by Gateway | |

- ⊕ ∩ Atl1
- ⊕ ∩ Atl2
- ⊕ ∩ Atl3
- ⊕ ∩ Bos1
- ⊕ 23114A/ETHERNET
  - Boston1 ← 462
- ⊕ ∩ Bos2
- ⊕ ∩ Bos3
- ⊕ ∩ Bos6
- . . .

460

VLAN STATES – ALL VLANS

| Vlan | Domain | Source | Device | Port | SCID | Cust. |
|---|---|---|---|---|---|---|
| 0 | Boston1 | Reserved | | | | A |
| 124 | Boston1 | Reserved | | | | A |
| 126 | Boston1 | Reserved | | | | B |
| 128 | Boston1 | Reserved | | | | B |
| 140 | Boston1 | Reserved | | | | B |
| 153 | Boston1 | Reserved | | | | C |
| 154 | Boston1 | Reserved | | | | C |
| 155 | Boston1 | Reserved | | | | C |
| 159 | Boston1 | Reserved | | | | D |
| 165 | Boston1 | Reserved | | | | E |

| VLAN TOOL | | | | | | □ X |
|---|---|---|---|---|---|---|
| File  Search  Help | | | | | | |
| □ □ □ | | | | | | |
| VD By Domain \| Orphan Ports | VLAN STATES – ERRORS | | | | | |
| | Vlan \| Domain \| Source \| Device \| Port \| SCID \| Cust. | | | | | |
| VD by Gateway | 1 | IPNMS | car1.bos1 | Device | No Data | |
| ··· ⊞ ∩ Atl1 | 1 | IPNMS | car2.bos1 | Device | No Data | |
| ⊞ ∩ Atl2 | 1 | IPNMS | mcd1.bos1 | Device | No Data | |
| ⊞ ∩ Atl3 | 1 | IPNMS | mcd2.bos | Device | No Data | |
| ··· | 1 | IPNMS | mgd1.bos1 | Device | No Data | |
| ⊞ ∩ Bos1 | 1 Boston1 | IPNMS | car1.bos1 | GbEthnt6/3 | IL\|ipco-sw2\|3/1 | |
| ⊞ 23114A/ETHERNET | 1 Boston1 | IPNMS | car1.bos1 | GbEthnt6/4 | IL\|ipco-sw2\|3/2 | |
| Boston1 | 1 Boston1 | IPNMS | car1.bos1 | GbEthnt6/5 | IL\|ipco-sw2\|4/7 | |
| ⊞ ∩ Bos2 | 1 Boston1 | IPNMS | car1.bos1 | GbEthnt6/7 | IL\|ipco-sw2\|3/6 | |
| ⊞ ∩ Bos3 | 1 Boston1 | IPNMS | car1.bos1 | GbEthnt6/7 | IL\|dial.ge1\|ge2\|... | |
| ⊞ ∩ Bos6 | ··· | | | | | |

474

FIG. 17

MANAGING VIRTUAL LOCAL AREA NETWORK DOMAINS

CROSS-REFERENCE TO RELATED APPLICATIONS

This application is a continuation-in-part of U.S. application Ser. No. 11/849,010 entitled "System and Method for Managing Virtual Local Area Networks" filed Aug. 31, 2007, which is hereby incorporated by reference in its entirety as though fully set forth herein.

BACKGROUND a. Field

Embodiments of the present invention generally relate to identifying, provisioning, and reporting virtual area network (VLAN) domains.

b. Background Art

A Virtual Local Area Network (VLAN) is a logical network within a physical network. VLANs are often created within physical networks to facilitate the administration of the network, by separating logical segments of the network, or to reduce network bandwidth usage by reducing the broadcast domain. A VLAN includes a set of logical connections between devices in the physical network. The VLAN protocol 802.1Q promulgated by the Institute of Electrical and Electronics Engineers (IEEE) defines the meaning of VLAN and sets forth an Ethernet tagged frame definition to accommodate VLAN communication over the network. The tagged frames include a VLAN Identifier (VID) that is allocated 12 bits, which limits the number of VLANS that can exist in a physical network to a finite number, specifically 4,096. In addition, the IEEE 802.1Q standard reserves VID 0 and VID 4,095 for other purposes, so these cannot be allocated to VLANs. As such, within a domain, the number of VLANs that can be defined is limited to 4,094. This limitation in the number VLANs essentially requires network operators to carefully manage VLANs on the network as well as the allocation of physical connections and devices to the VLANs. For example, a set of router channels, switch channels and trunks may be allocated to VLAN 101 for an enterprise requiring communication service over a backbone network. Later, when another enterprise requires a VLAN, the network operator must be able to quickly determine that VLAN 101 cannot be used and to quickly identify available router channels, switch channels and trunks for the new VLAN. Because network usage and configurations are always changing, it may be that VLANs that were previously defined are no longer being used even though records may show otherwise. In such cases, it may be possible to reassign the unused VLAN to a new enterprise.

Conventional approaches to managing VLAN usage in a network have been largely manual in nature. For example, a provisioning engineer must manually query each device in a domain to determine if it is part of a VLAN and/or what VID it is assigned to. In large networks this process can be very time consuming. The records showing available VLANs and their assigned devices are often manually maintained. Such manual updating of records is prone to errors.

It is with respect to these and other considerations that embodiments of the present invention have been developed.

SUMMARY

In one embodiment, a computer-implemented method of managing a virtual local area network (VLAN) domain associated with a network is provided. In this embodiment, the method comprises: defining a VLAN domain comprising a list of a plurality of connectively coupled ports of the network associated with the VLAN domain; and assigning at least one VLAN associated with the plurality of connectively coupled ports.

In one embodiment, the computer-implemented method of claim gathers actual network element configuration data from a plurality of network elements in the network. The actual network element configuration data identifies one or more VLANs to which at least some of the plurality of network elements are actually allocated. The method can further correlate the actual network element configuration data with administrative VLAN data, wherein the administrative VLAN data identifies one or more VLANs recognized by a business process. Based on the correlating, the method may also determine one or more VLANs that are not commonly identified in both the actual network element configuration data and the administrative VLAN data within the defined VLAN domain. The method may further report the VLANs that should be provisioned and the VLANs that at least some of the plurality of network elements are allocated to. In one embodiment, the reporting comprises indicating the one or more VLANs that are not commonly identified in both the actual network element configuration data and the administrative VLAN data. The operation of reporting may further indicate one or more VLANs commonly identified in both the administrative VLAN data and the actual network element configuration data. The operation of reporting may also simultaneously report one or more VLANs identified for each of a plurality of VLAN domains.

In one embodiment, the operation of gathering actual network element configuration data may comprise polling the plurality of network elements for specified configuration data and/or gathering the actual network element configuration data from network elements at a plurality of logical sites.

In another embodiment, a system for managing virtual local area networks (VLANs) in a network is provided. In this embodiment, the system comprises a network provisioning module for defining a VLAN domain comprising a list of a plurality of connectively coupled ports of the network associated with the VLAN domain and assigning at least one VLAN associated with the plurality of connectively coupled ports. The system further comprises a a network monitoring system operable to gather actual network element configuration data from a plurality of network elements associated with one or more VLAN domains, wherein the actual network element configuration data identifies one or more VLANs that at least some of the plurality of network elements are actually allocated to; and a VLAN services module operable to correlate the actual network element configuration data with administrative VLAN data. The administrative VLAN data identifies one or more VLANs recognized by a business process. In one particular embodiment, the system is further operable to determine one or more VLANs that are not commonly identified in both the actual network element configuration data and the administrative VLAN data.

In one embodiment, the system further comprises a VLAN management user interface operable to report VLAN status determined by the VLAN services module. The VLAN management user interface can be further operable to issue a notification that a VLAN is reserved and/or to receive a reservation request to reserve a specified VLAN. The VLAN services modules can be further operable to reserve the specified VLAN by marking the VLAN as reserved, assigning the VLAN to an entity, and allocate one or more specified network elements to the specified VLAN of the VLAN domain. In one embodiment, the VLAN management user interface is further configured to receive a release request to release a specified VLAN that is currently reserved, and wherein the VLAN management services module is further operable to responsively release the specified VLAN.

In another embodiment, the VLAN management user interface is further operable to simultaneously present VLAN status of VLANs for multiple selected VLAN domains. The VLAN management user interface can also be operable to enable a user to specify the multiple selected VLAN domains.

In one embodiment, the system further comprises a VLAN orders data store including data related to VLANs that have been ordered; a VLAN provisioning data store including data related to VLANs that have been provisioned within the VLAN domain; and a configuration generation data store storing data related to network element configurations. In this embodiment, the VLAN network services module is operable to correlate data from the VLAN orders data store, the VLAN provisioning data store and the configuration generation data store.

The foregoing and other aspects, features, details, utilities, and advantages of the present invention will be apparent from reading the following description and claims, and from reviewing the accompanying drawings.

BRIEF DESCRIPTION OF THE DRAWINGS

FIGS. 10-17 illustrate exemplary user interfaces for provisioning and managing VLANs.

DETAILED DESCRIPTION

Figure 1:
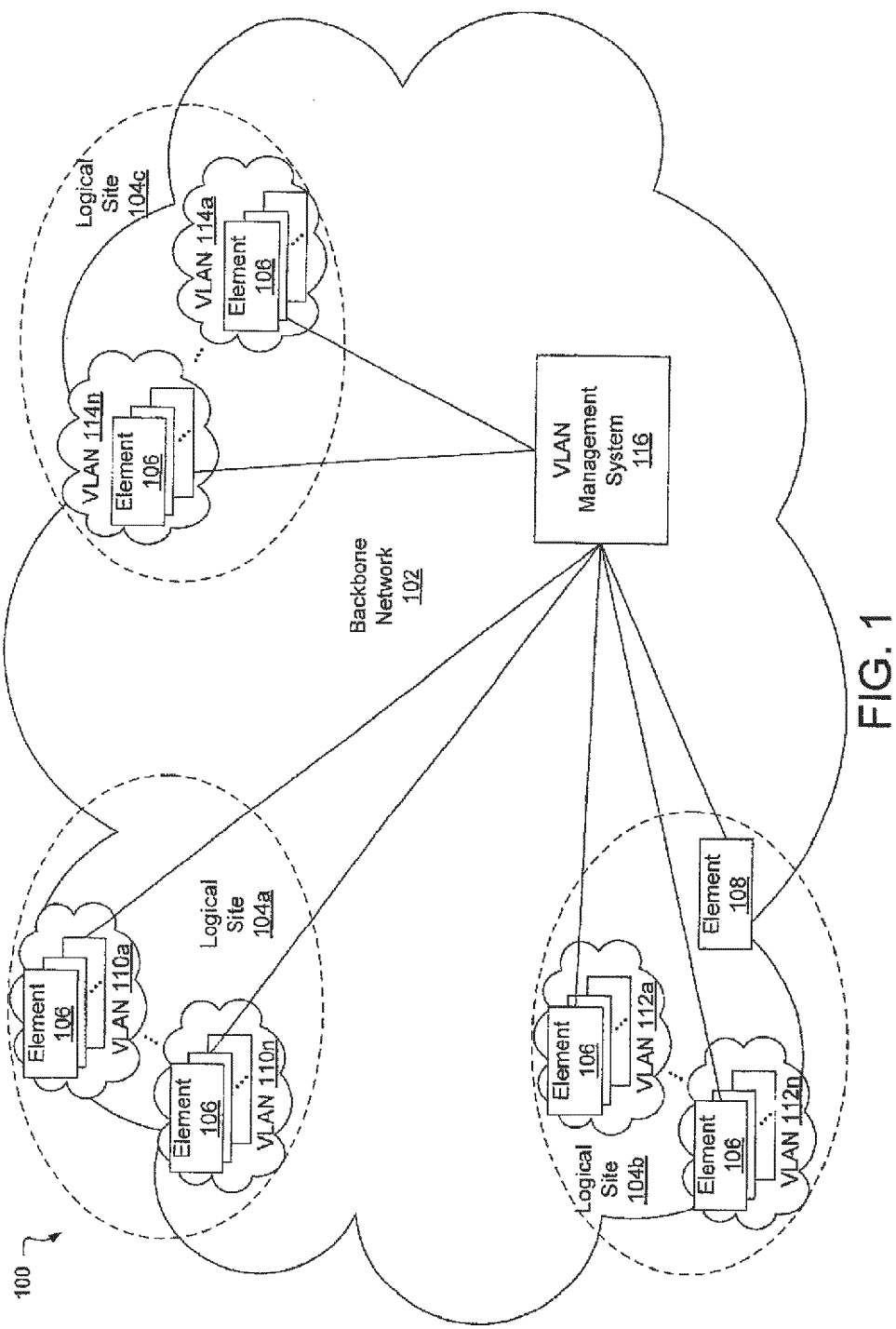
FIG. 1 illustrates an operating environment suitable for practicing embodiments of the present invention.

Embodiments of the present invention generally relate to identifying, provisioning, and reporting virtual area network (VLAN) domains. A VLAN domain is defined by a list of connectively coupled ports assigned to the domain. The ports may be located at a single logical site or may be distributed across a plurality of logical sites. A plurality of individual VLANs are assigned to one or more individual VLAN domains. Each VLAN assigned to a VLAN domain must be uniquely identifiable within the VLAN domain. However, a particular VLAN need not be uniquely identifiable with respect to other VLANs that are not assigned to any common VLAN domains.

Some embodiments relate to correlating different sets of VLAN related data, including data gathered from actual network elements, to determine whether each of one or more VLANs of a VLAN domain are available or unavailable. Correlating VLAN related data may involve determining whether each of a plurality of VLANs of a VLAN domain have been commonly identified in different sets of VLAN related data. Embodiments may further include comparing data associated with commonly identified VLANs of a VLAN domain to determine whether the different sets of VLAN related data are consistent. This may involve comparing VLAN related data associated with VLANs identified in actual network element configuration data to data associated with VLANs identified in one or more sets of administrative data.

Some embodiments relate to automatically discovering network element configurations to determine whether network elements have been allocated to one or more VLANs in a VLAN domain of the network. Embodiments further relate to determining whether VLANs of a domain have been assigned to an entity, such as a business organization. Embodiments may further involve notifying a user whether or not a VLAN is available to be assigned. At least one set of administrative data identifies VLANs that have been determined through business processes have been or should be provisioned. Comparing actual network element configuration data can include mapping VLAN related data associated with a VLAN of a domain identified by network elements to VLAN related data associated with VLANs of the domain identified in the one or more sets of administrative data.

Embodiments further relate to automatically gathering network element configuration data from network elements assigned to one or more VLAN domains. As described above, a VLAN domain may be located at a single logical site or may be distributed across a plurality of logical sites. Logical sites may include geographical regions, metropolitan markets, business sites, or others. For each of the domains, each of a possible number of VLANs assigned to a domain (e.g., 4,096) is analyzed to determine status of the VLANs. Status may include availability of the VLAN for VLAN for reservation. Status may further include an indication whether different sets of VLAN related data are consistent as to each VLAN in the one or more VLAN domains.

Embodiments further relate to systems and methods for reporting VLANs identified in the actual network element configuration data and VLANs identified in the one or more sets of administrative data. VLANs that are identified by all the sets of administrative data and the actual network configuration data may be marked as valid. VLANs that are identified in fewer than all the sets of data may be marked as invalid. Marking VLANs as valid or invalid may involve color coding VLAN identifiers in a report.

Some embodiments relate to systems and methods for reporting VLANs identified in one or more sets of data. The report may further present additional details of selected VLANs. Details may include customer(s) assigned to a selected VLAN, device(s) allocated to the selected VLAN. According to one embodiment of reporting VLANs, sets of one or more VLAN status are presented simultaneously for each of multiple VLAN domains. For example, status of VLANs of two different VLAN domains may be presented simultaneously. The VLAN domains can be selected by the user.

Embodiments further relate to systems and methods for receiving a VLAN reservation request and responsively reserving a specified VLAN assigned to one or more VLAN domains. The VLAN reservation request may be received from a user through a user interface. Reserving the VLAN may involve marking a VLAN identifier as reserved in a data store of VLAN identifiers for one or more VLAN domains. Reserving may further involve assigning the specified VLAN to a selected entity. Reserving may further involve allocating one or more selected network elements to the specified VLAN.

Embodiments may further allow for releasing a VLAN that was previously reserved. Releasing a VLAN may involve unmarking a VLAN identifier in a data store of VLAN identifiers, deallocating network elements from the previously reserved VLAN, and unassigning the previously reserved VLAN from an entity previously assigned to the VLAN.

Embodiments of systems and methods may be operable to issue a notification that a VLAN is currently reserved within a VLAN domain. Embodiments may further prompt for a request to override a current reservation. If an override request is received, the currently reserved VLAN is released, and the VLAN is reserved.

Prior to describing one or more preferred embodiments of the present invention, definitions of some terms used throughout the description are presented.

Definitions

The term "provisioning" or "provision" refers to setting up a resource for use a network. Provisioning can be automatic or manual or a combination thereof.

A "module" is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

The term "computer-readable media" is media that is accessible by a computer, and can include, without limitation, computer storage media and communications media. Computer storage media generally refers to any type of computer-readable memory, such as, but not limited to, volatile, non-volatile, removable, or non-removable memory. Communication media refers to a modulated signal carrying computer-readable data, such as, without limitation, program modules, instructions, or data structures.

Exemplary System

FIG. 1 illustrates a backbone network 102 spanning multiple logical sites 104. In one embodiment, for example, a logical site 104 comprises a logical representation of a physical or geographical location that can house network equipment. At one or more of the logical sites 104 VLANs are composed of logical configurations of network elements 106. The VLANs may be assigned to one or more VLAN domains (e.g., logical groupings or aggregation of multiple network elements and ports). The VLAN domains, for example, may be located at a single logical 104 site or may be distributed across a plurality of logical sites 104.

A network element 106 is generally any type of network resource that can facilitate communications, and can include hardware, software, firmware components or any combination thereof. By way of example, but not limitation, a network element 106 could be a router, switch, server, gateway, port (e.g., router or switch port), appliance, or channel. One or more network elements 106, or parts of network elements 106, within a logical site 104 can be configured to form a logical network, referred to as a virtual local area network (VLAN). Some network elements, such as network element 108, may not be part of a VLAN or a VLAN domain; e.g., network element 108 may not be allocated to a VLAN or a VLAN domain.

A logical site 104 is any administratively useful logical area in the network 102 or on the edge of the network 102, and can correspond to, by way of example, but not limitation, a geographic region, a metropolitan market or a business site. Thus, for example, the cities of San Jose, Calif., New York City, N.Y., Denver, Colo., and others may each include one or more logical sites in which VLANs can be defined. VLAN domains may be located at a single logical site or may be distributed across a plurality of logical sites. According to one embodiment, in each VLAN domain there can be up to $2^{12}$ (4,096) VLANs defined. In FIG. 1, VLANs at different regions 104 are called out with different numbers for illustrative purposes. For example, logical site 104a is depicted as including VLAN 110a through VLAN 110n; logical site 104b includes VLAN 112a through VLAN 112n; and logical site 104c includes VLAN 114a through 114n, wherein the letters 'a' ... 'n' have no inherent significance.

In the embodiments illustrated herein, VLANs are created in or at edges of a backbone network 102. Each of a limited number of VLANS (e.g., 4,096 VLANs (minus any VLANs that not useable under IEEE 802.1Q)) that can be used within a VLAN domain may be assigned to a particular entity, such as a corporation or other organization. In this fashion, an entity assigned to a VLAN uses the VLAN to access the backbone network 102 and ultimately the Internet, for example. With further regard to the definition of VLANs, those skilled in the art will understand how a VLAN could be defined; e.g., how one or more network elements 106 might be included or configured in any particular VLAN and how the network elements, or portions of elements, may be arranged and configured to form the VLAN.

Figure 2:
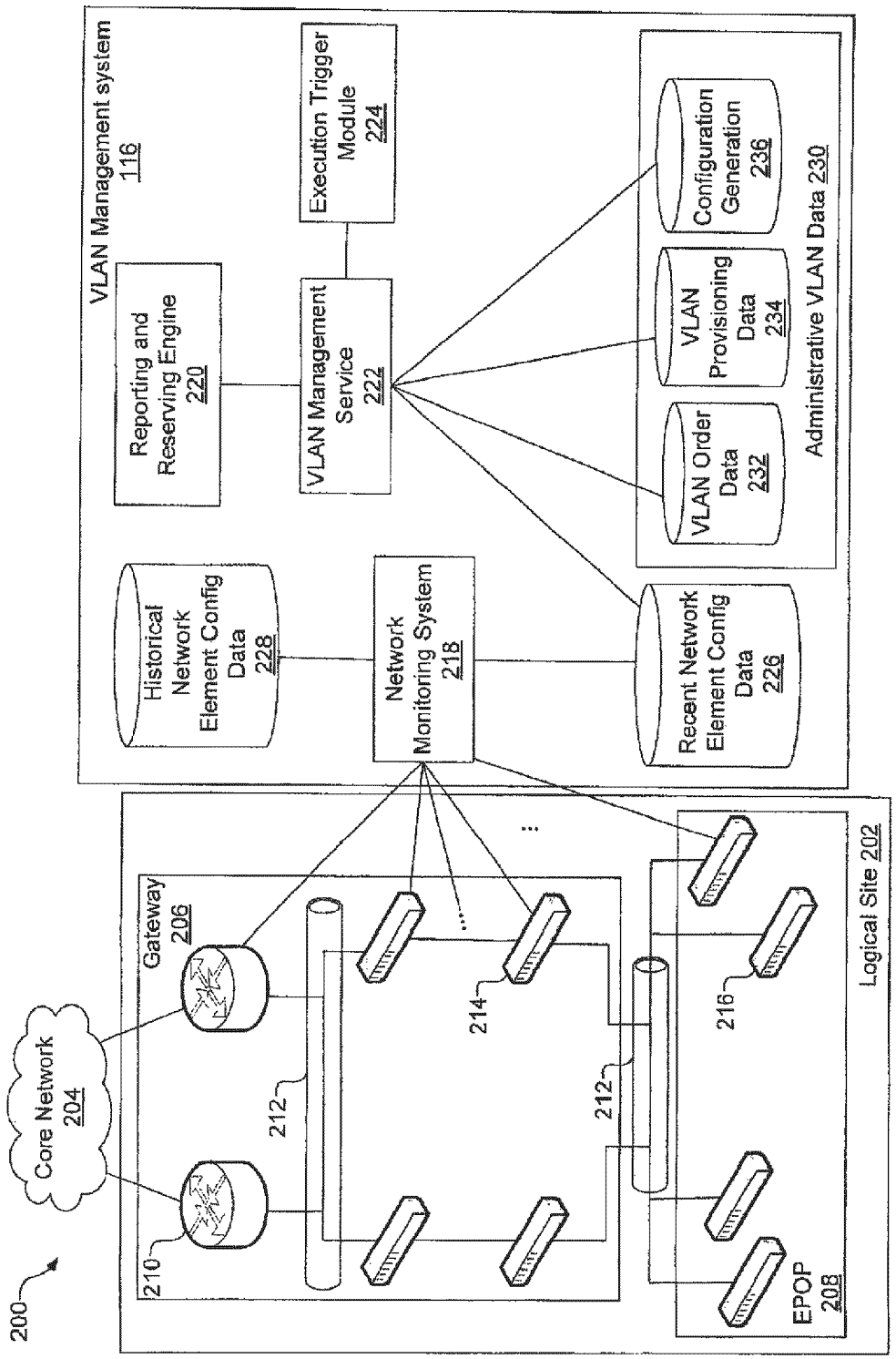
FIG. 2 illustrates a system for identifying and reporting VLAN status in accordance with the operating environment of FIG. 1.

By way of example, but not limitation, in various embodiments a VLAN may be created at the interconnection of a gateway of the backbone network 102 and a metropolitan area switch or extended point of presence (EPOP) that connects to an entity assigned to the VLAN (see, e.g., FIG. 2). In this case, the VLAN may be formed from ports on one or more routers through the gateway, a trunk to the metropolitan area switch that is connected to the assigned entity, and ports on the metropolitan switch. The VLAN is assigned an available VLAN identifier (VID), which for example, may comprise a number from 1 to 4,095 in one particular embodiment. The VID can be used to determine the VLAN domain defined by a list of ports of routers, router ports, the trunk, the metro switch, the metro switch ports, and the like. Data (e.g., packets or frames) communicated to and from the assigned entity are typically labeled (or tagged) with the associated VID so that the data is properly routed through the metro switch, across the trunk, and through the gateway routers that form the VLAN. Multiple VLANs in some embodiments run across each trunk. To further illustrate, an exemplary configuration is illustrated in FIG. 2 and described further below.

In order to use a VLAN within a VLAN domain, a network administrator or provisioning engineer determines what VIDs are available within the VLAN domain. For example, an entity may place an order for a VLAN at a port associate with a VLAN domain. In response, the network administrator or provisioning engineer attempts to determine an available VID for the VLAN domain. If a VLAN has been defined and assigned a VID for a particular VLAN domain and is in use, then the VID is unavailable for the VLAN domain. Within a VLAN domain, if a VLAN has been defined, network elements have been allocated to the VLAN within the VLAN domain, and the VLAN is assigned to an entity, the VLAN is considered to be "consumed" within that VLAN domain; i.e., once a VLAN is consumed for a VLAN domain, the VLAN is typically no longer available for assignment to another entity within than VLAN domain (however, it is possible to reassign the VLAN to another entity).

Sometimes it can be difficult to determine whether a VLAN has been consumed for a VLAN domain, or whether a given network element is available within the network to create another VLAN. For example, although records may show that a VLAN has been assigned to an entity, the entity may no longer be using the VLAN. As another example, a network element configuration may change such that the network element is no longer allocated to a VLAN or becomes allocated to a VLAN. In some cases network element discovery is automated for network elements of a single vendor; e.g., automated discovery of only Cisco™ devices. However, in conventional systems where devices from multiple different vendors are used, network administrators or provisioning engineers often had to go through a painstaking task of manually querying network elements for configuration information in order to identify VLANs that were in use, in order to then identify what VLANs were available and resources that could be assigned to a VLAN.

In the present embodiment, a VLAN management system 116 correlates different sets of VLAN related data for one or more VLAN domains to identify VLANs, determine status of VLANs and report the status of the identified VLANs, so that network provisioning engineers can readily determine VLANs that are being used for the one or more domains, VLANs that are available for the one or more VLAN domains, and what elements are, or can be, allocated to VLANs of one or more VLAN domains in the network. The VLAN management system 116 also reserves or releases VLANs for a VLAN domain based on user input. Identifying VLANs typically involves determining if one or more network elements have been allocated to a VLAN(s), and if so, what VLAN(s) the network elements are allocated to. To do this, the management system 116 monitors the state of the network 102 and correlates actual network element configuration data with VLAN business or administrative data, including provisioning data, orders data, and configuration data. Embodiments of these are discussed in further detail below. The VLAN management system 116 can also detect errors in the network configuration and provisioning or VLAN definition records (e.g., the most recently obtained network configuration does not match records showing what elements are allocated to a VLAN). Beneficially, the VLAN identification and reporting can be performed automatically.

FIG. 2 illustrates an exemplary network arrangement 200 including network elements at a logical site 202 providing communication to and from a core network 204, and an embodiment of a VLAN management system 116. The core network 204 is typically part of a broader network, such as backbone network 102 of FIG. 1, and performs core routing functions for communications traversing the gateway 206. The logical site 202 includes a gateway 206 and an EPOP 208.

For ease of illustration only a small number of network elements are shown in the gateway 206 and the EPOP 208; however, in an actual network implementation, many more network elements would exist. In this particular embodiment the gateway 206 includes routers 210, an Ethernet trunk 212 and Internet protocol switches 214. IP switches 214 are typically located at a collocation center that provides a common site for interconnection of numerous networks and providers. EPOP 208 includes a number of metropolitan (metro) switches 216. Ethernet trunks 212, IP switches 214, and metro switches 216 may support, for example, 1 or 10 Gigabit Ethernet.

The routers 210, trunks 212, IP switches 214 and metro switches 216 are typically provisioned and configured for operation. Configuring these network elements may be automatic or manual or any combination thereof. As mentioned, configuring the network elements can involve allocating the network elements or portions thereof to a VLAN associated with one or more VLAN domains. For example, a port on a router 210 may be allocated to a VLAN having VID 174 (or some other number between 1 an 4,094). The VLAN management system 116 can determine whether and how the network elements (e.g., routers 210, trunks 212, IP switches 214 and metro switches 216) are actually allocated to VLANs by gathering configuration data from the network elements themselves. Furthermore the VLAN management system 116 can correlate the data obtained from the network elements with one or more sets of administrative VLAN data to determine differences and similarities between the actual VLAN settings and administratively recognized VLAN settings.

The exemplary VLAN management system 116 shown in FIG. 2 includes a number of components or modules that may be implemented in hardware, software (e.g., for operation on a processor), firmware or any combination thereof. For example, some components may be implemented in one or more computer servers and data stores. These components may be geographically distributed or centralized. In this embodiment, the VLAN management system 116 includes a network monitoring system (NMS) 218, a reporting and reserving engine 220, a VLAN management services module 222, and an execution trigger module 224.

The NMS 218 is in operable communication with the network elements at the logical site 202 and is operable to gather network element configuration data from the network elements. Although only one logical site 202 is shown in FIG. 2, it is recognized that a VLAN domain may be assigned ports solely within the logical site 202 or may be assigned one or more ports within the logical site 202 and one or more ports distributed at one or more additional logical sites. For ease of illustration, not all connections are shown between the NMS 218 and all the network elements, but the NMS 218 is configured to communicate with all the network elements. In addition, the NMS 218 is typically connected to many other logical sites (e.g., via the core network 204) in addition to the logical site 202 shown in FIG. 2, and can even be connected to all network elements in the broader backbone network, so that the NMS 218 can capture network element configuration data for all logical sites (whether or not part of one or more VLAN domains) in an entire network.

The NMS 218 gathers network element configuration data, such as, but not limited to, network element serial number (or other identifier), interface type (e.g., Gigabit Ethernet), IP address, and VLAN identifier. The NMS 218 stores the gathered network element configuration data in a recent network element configuration data store 226. The network element configuration data gathered and stored in the network element configuration data store 226 is referred to as "actual network element configuration data", because it represents a recent actual configuration of network elements.

In some embodiments the NMS 218 also maintains historical network element configuration data in a historical network element configuration data store 228. The NMS 218 may, for example, periodically poll the network elements for network element configuration(s) and store the data in the recent network element configuration data store 226, and copy the previous set of network element configuration data from the data store 226 to the historical network element configuration data store 228. Later, when changes or problems are observed at the logical site 202 or elsewhere within a network, the historical network element data store 228 can provide a reference to facilitate identification of reasons for changes or problems. In addition the historical network element configuration data from store 228 can be used to revert to a prior network configuration.

Typically, network administrators attempt to track the provisioning and configurations of VLANs in business and administrative records that document changes as they are made. For example, an entity may order a VLAN, and the VLAN may be reserved and provisioned. This order, reservation and provisioning is documented in administrative records. More specifically VLAN related data associated with business processes are captured in administrative records. In this embodiment, these administrative records are collectively referred to as administrative VLAN related data 230 (or simply administrative VLAN data 230).

Administrative VLAN data 230 may be viewed as business data that is/was generated and stored during the administration of VLANs in the network, such as during the process of taking orders for VLANs, determining network element configurations for VLANs, assigning VLANs to entities (e.g., companies or other organizations). For any number of reasons, the actual VLAN status or configuration at the logical site 202 may not agree with the VLAN status or configuration that is stored in administrative records. For example, a VLAN could actually be being used by one entity, but business records (in the administrative VLAN data 230) may indicate that the VLAN is assigned to another entity. As another example, the actual configuration of network elements in a VLAN may be inconsistent with the configuration that network administrators believe exists or should exist as indicated in the administrative VLAN data 230. Inconsistencies may arise, for example, due to changes that are made to network element configurations without these changes being noted in the administrative records. As another example, testing of network elements may leave them in an unknown state. As yet another example, VLAN related changes that administrators believe are made to logical site (and recorded in the administrative VLAN data 230), may not actually be made.

In the illustrated embodiment, the administrative VLAN data 230 includes a VLAN order data store 232, a provisioning data store 234, and a configuration generation data store 236. Any of the data stores may be composed of one or more data stores. For example, the VLAN order data store 232 may consist of data in an order entry system and data in a sales system, which may be distributed throughout a network service provider enterprise. Thus, each of the data stores may be logical assemblies of multiple sets of data.

In general, the VLAN order data store 232 includes order data related to orders for VLANs and VLAN domains. The VLAN order data store 232 is typically populated by an order entry system and/or sales system of the network service provider. The configuration generation data store 236 is operable, or is used, to generate a network elements configuration(s) for a VLAN or VLAN domain. The configuration generation data store 236 is vendor neutral, meaning that is can accept many different attribute inputs (IP addresses, VLANs, VLAN domains, etc.) and generate configuration(s) that designate particular device criteria, such as, but not limited to, vendor, brand or model. The configuration(s) generated by the configuration generation data store 236 are applied to the network elements (e.g., routers and devices in the network). The VLAN provisioning data store 234 includes a superset of the VLAN related data from the other administrative VLAN data stores.

The data stores may store data in any of a number of formats, such as, but not limited to, flat files, object oriented or hierarchical. The data stores may be implemented using Structured Query Language (SQL), Oracle database format, or otherwise. Generally, the data stores include data in the form of logical data objects. Each data object includes one or more data fields. The data fields are logically linked to each other to form the object, and are not necessarily stored together. For example, a data object may be a linked list of data fields, or a set of pointers to the associated data fields. The data fields store (or reference) VLAN related data associated with administratively recognized VLANs and VLAN domains (e.g., as in the administrative VLAN data 230) or actually identified VLANs and VLAN domains (e.g., as in the recent network element configuration data 226).

The data fields store data of various data types. More than one of the data stores may include one or more of the same types of data along with different types of data. For example, the recent network element configuration data store 226 typically contains VLAN identifiers (VIDs) and VLAN domain identifiers for network elements and the VLAN provisioning data store 234 typically contains VLAN identifiers for VLANs and VLAN domains that business processes indicate are (or should be) provisioned. Although the certain types of data may be stored in more than one data store, the data may be formatted in different formats.

Figure 3:
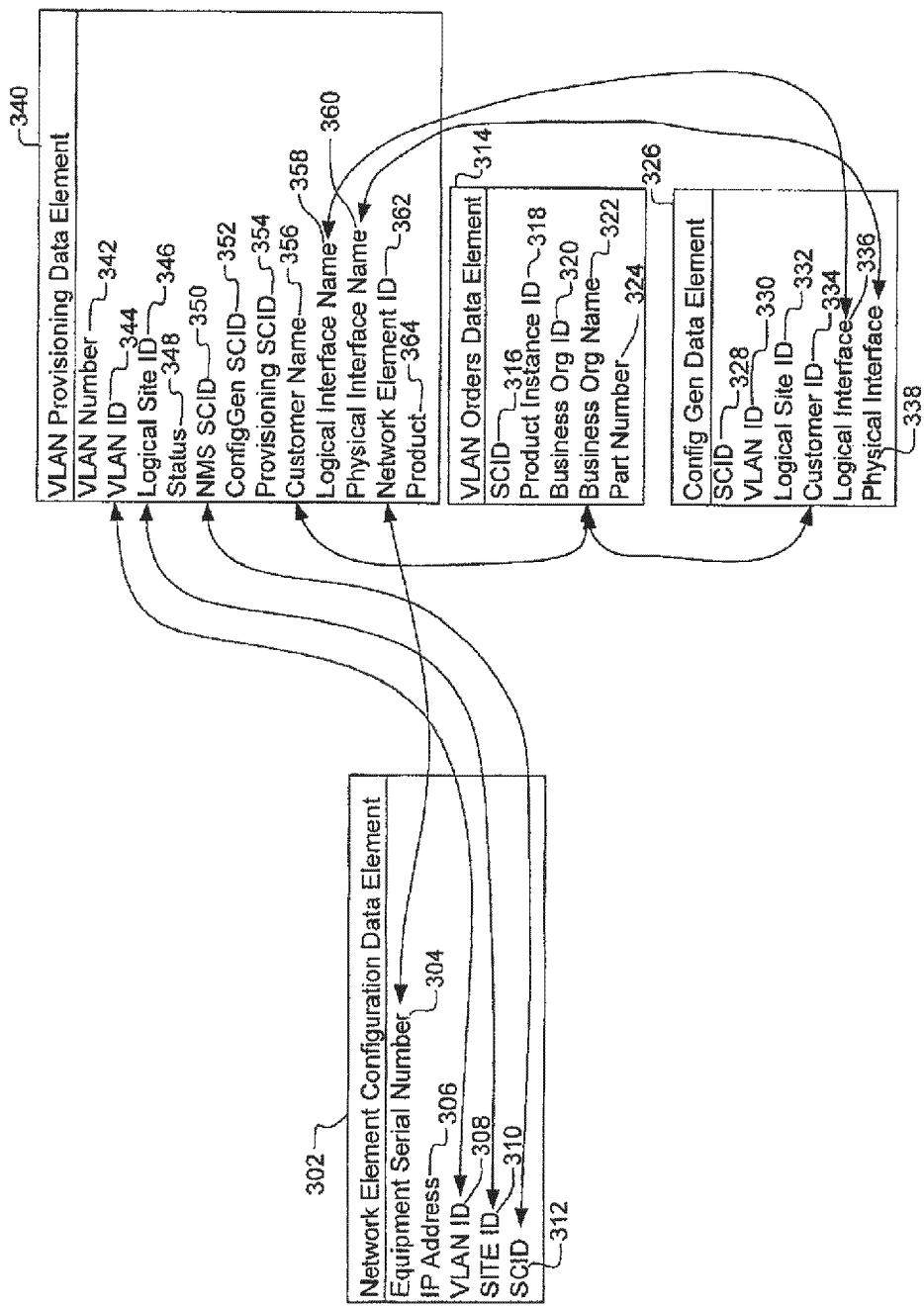
FIG. 3 illustrates exemplary data elements that may be stored in a network element configuration data store, a VLAN provisioning data store, a VLAN orders data store, and a configuration generation data store.

Exemplary data objects that may be stored in the data stores shown in FIG. 2 are illustrated in FIG. 3 in accordance with one embodiment. Each data object includes a set of exemplary data fields. The recent network element configuration data store 226 may include multiple network element configuration objects 302. Each network element configuration data object 302 corresponds to a network element. Typically there will be one network element configuration data object 302 stored for each network element that is polled at the logical site 202 (and other logical sites connected to the NMS 218).

The network element configuration data object 302 includes an equipment serial number field 304, and IP address field 306, a VLAN ID field 308, and site ID field 310, and a service component ID (SCID) field 312. The equipment serial number field 304 stores the equipment serial number of the network element. The IP address 306 is the IP Address of the network element. The VLAN ID field 308 stores a VLAN identifier that identifies the VLAN to which the network element is allocated, if at all. The VLAN ID field 308 corresponds to the VID of the VLAN at the logical site 202. If the network element is not allocated to a VLAN, then the VLAN ID field 308 will store a "null".

The Site ID field 310 identifies the logical site 202. This may be an alphanumeric code corresponding to logical site 202; e.g., three or four letters of the city name of the logical site 202. The service component ID field 312 stores an identifier of a billable network-based service or product that can be associated with a network element, entity, VLAN ID or other data. Service component IDs are typically also used in service and sales contracts, and hence can be used to associate a network service provider's billable services to sales or services to customers. As is shown in FIG. 3 and discussed further below, the order data 232, provisioning data 234, and configuration generation data 236 each have a field for a service component ID.

In one embodiment, the VLAN orders data store 232 stores a plurality of VLAN orders data objects 314. Each VLAN orders data object 314 includes a SCID 316. As with other data objects, the SCID field 316 identifies a billable network-based service or product. The SCID field 316 includes a unique value assigned to the service component. A product instance ID (PIID) field 318 identifies a particular instance state of the service or product identified by the SCID field 316. The PIID field 318 may be viewed as the post-provisioned state against which all future changes will be made. As such, in this embodiment the value in one or the other of the SCID field 316 or the product instance ID field 318 uniquely identifies a service component. The VLAN orders data object 314 also includes a business organization ID field 320 and a business organization name 322. The business organization ID field 320 and name field 322 specify which entity (e.g., business organization) the order is associated with. A part number field 324 identifies a particular product related to the order.

EXAMPLE 1

Physical interface:
RouterA
port Gigabit Ethernet1/1
Logical interface:
RouterA
interface Gigabit Ethernet1/1.100 (100=VLAN ID)

EXAMPLE 2

Physical interface:
interface GigabitEthernet6/23
description BBBL36186::BULINK, INC
no ip address
no ip redirects
no ip directed-broadcast
no shutdown
fair-queue
storm-control broadcast level 0.34
mls qos trust dscp
no cdp enable
Logical interface:
!
interface GigabitEthernet6/23.107
description BBBL36185::BULINK, INC
encapsulation dot1Q 107
ip address 4.79.xx.233 255.255.255.252
no ip directed-broadcast
no ip proxy-arp
no cdp enable
mls netflow sampling
no shutdown Each data object in the VLAN provisioning data store 234 includes at least one data type (and usually two or more) that is common to each of the other data stores. This enables mapping of data across different data stores, and further enables correlating data of different data stores in order to determine inconsistencies and commonalities. In one embodiment, the VLAN provisioning data store 234 includes a plurality of VLAN provisioning data objects 340. In this embodiment there is a VLAN provisioning data object for each VLAN in the network. Each VLAN in the network has an associated number that is unique network wide. As such, the VLAN number field 342 designates the particular VLAN. Each VLAN can be uniquely identified by a VLAN ID (e.g., the associated VID defined in IEEE 802.1Q) and logical site pair (VID/logical site pair). Therefore, each VLAN provisioning data object 314 includes a VLAN ID field 344 and a logical site ID field 346. The VLAN ID field 344 ranges in value from 1 to 4,094; the logical site ID field 346 identifies the logical site of the VLAN identified by VLAN number 342.

A status field 348 indicates the status of the VLAN. In one embodiment the status indicates whether there is consistency or inconsistency in VLAN data across the multiple data stores. The status field 348 may take on any one of multiple values, such as, but not limited to, "OK", "VALID", "RESERVED", "INVALID", or "ERROR". An NMS SCID field 350 stores the SCID of a corresponding data object in the network element configuration data store. More specifically, the NMS SCID field 350 contains the SCID 312 of the network element configuration data object that has a VLAN ID 308 and site ID 310 that correspond to VLAN ID 344 and Logical Site ID 346, respectively.

A ConfigGen SCID field 352 stores the SCID value from the SCID field 320 in the config gen data object 326 that corresponds to the VLAN ID 344 and logical site ID 346. The Provisioning SCID 354 is the SCID associated with the VLAN provisioning data object 340, which is typically entered or specified during the VLAN ordering or provisioning process. In one embodiment the VLAN management service 222 (FIG. 2) reconciles the Provisioning SCIDs 354 with configured SCIDs and/or ordered SCIDS on a periodic basis (e.g., nightly). The VLAN Provisioning Data object 340 also includes a customer name field 356, a logical interface name field 358, and a physical interface name field 360, which identify the associated business entity, logical interface and physical interface, respectively. The VLAN Provisioning data object 340 also includes a network element ID field 362, which identifies the network element associated with the VLAN ID 344 at the logical site 346. A product field 364 includes data identifying a particular product associated with the VLAN having VLAN ID 344.

One or more data fields in the data objects of each data store can be mapped to one or more data fields in the data objects of other data stores in a correlation process. In FIG. 3 there are shown just a few possible mappings between the different data objects that can be carried out during the VLAN data correlation process. For example, the equipment serial number 304 of each network element configuration data object 302 can be mapped to a corresponding network element ID 362 in a VLAN provisioning data object 340. The VLAN ID 308, Site ID 310 and SCID 312 of each network element configuration data object 302 can then be mapped to the VLAN ID 344, the logical site ID 346 and the NMS (Network Monitoring System) SCID 350, respectively, in order to determine consistencies or inconsistencies between actual network element configuration and the configuration stored during business and administrative processes (e.g., ordering, provisioning, allocating and assigning of VLANs).

As another example, Business Org Name 322 of a VLAN Orders Data Object 314 can be mapped to the customer name 356 of one or more VLAN Provisioning Data objects 340 and/or the customer ID 334 of one or more Config Gen data objects 326. As yet another example, logical interface name 358 and the physical interface name 360 of the VLAN provisioning data object 340 can be mapped to the logical interface 336 and the physical interface 338 of the config gen data object 326, respectively. Other possible mappings are shown below, wherein indicates a mappable correspondence between sets of data:

VLAN provisioning data object 340 to network element configuration data object 302:
Logical Interface Name 358 IP Address 306 VLAN provisioning data object 340 to config gen data object 326:
Customer Name 356 Customer ID 334
ConfigGen SCID 352 SCID 328 VLAN orders data object 314 to VLAN Provisioning data object 340:
Part Number 324 Product 364

Referring again to FIG. 2 more specifically, the VLAN management system 116 includes functionality for correlating different sets of VLAN data. In general, correlating refers to mapping corresponding data fields between multiple data stores and determining commonalities and inconsistencies between different sets of VLAN data. The VLAN management system is also operable to present VLAN status and configuration data and enable a user to reserve or release a VLAN at the logical site 202 or another logical site. The correlating function is carried out by the VLAN management services module 222. The VLAN management services module 222 transmits results of the correlation to the reporting and reserving engine 220. In this embodiment, the reporting and reserving engine 220 is essentially a user interface outputting data to, and receiving data from, a user.

In some embodiments, data is pushed from the VLAN management services module 222 to the reporting and reserving engine 220. For example, results from correlation of the various data sets could be uploaded to the reporting and reserving engine 220 periodically. The VLAN management services module 222 typically performs the data correlation at regular time intervals. For example, the execution trigger module 224 can send a command to the VLAN management services module 222 to being VLAN data analysis. The execution trigger module 224 may be a "cron" job in a Unix platform, or some other timing mechanism that causes the VLAN management services module 222 to carry out the data correlation. For example, VLAN analysis (e.g., data correlation) may be triggered in the VLAN management services module 222 every 15 minutes or some other specified time interval.

Accordingly, in various embodiments, the VLAN management services module 222 automatically correlates data in the recent (actual) network element configuration data store 226 with one or more of the data sets in the administrative VLAN data 230 or correlates data from the data stores in the administrative VLAN data 230. For example, in one scenario the VLAN management services module 222 loads data from the recent network element configuration data store 226, the provisioning data store 234 and the configuration generation data store 236 and correlates VLAN identification, logical site identification and service/product identification provided by each of those data stores. Because the formats used by the different data stores may be different, the VLAN services module may reformat the sets of data into a neutral format. In some embodiments, the VLAN management services module 222 stores VLAN status and/or other VLAN related data in the VLAN provisioning data store 234.

Exemplary Graphical User Interface

FIGS. 4-9 illustrate exemplary graphical user interfaces (GUIs) for administering a VLAN domain; and FIGS. 10-17 illustrate exemplary graphical user interfaces for administering VLANs within a VLAN domain.

Figure 4:
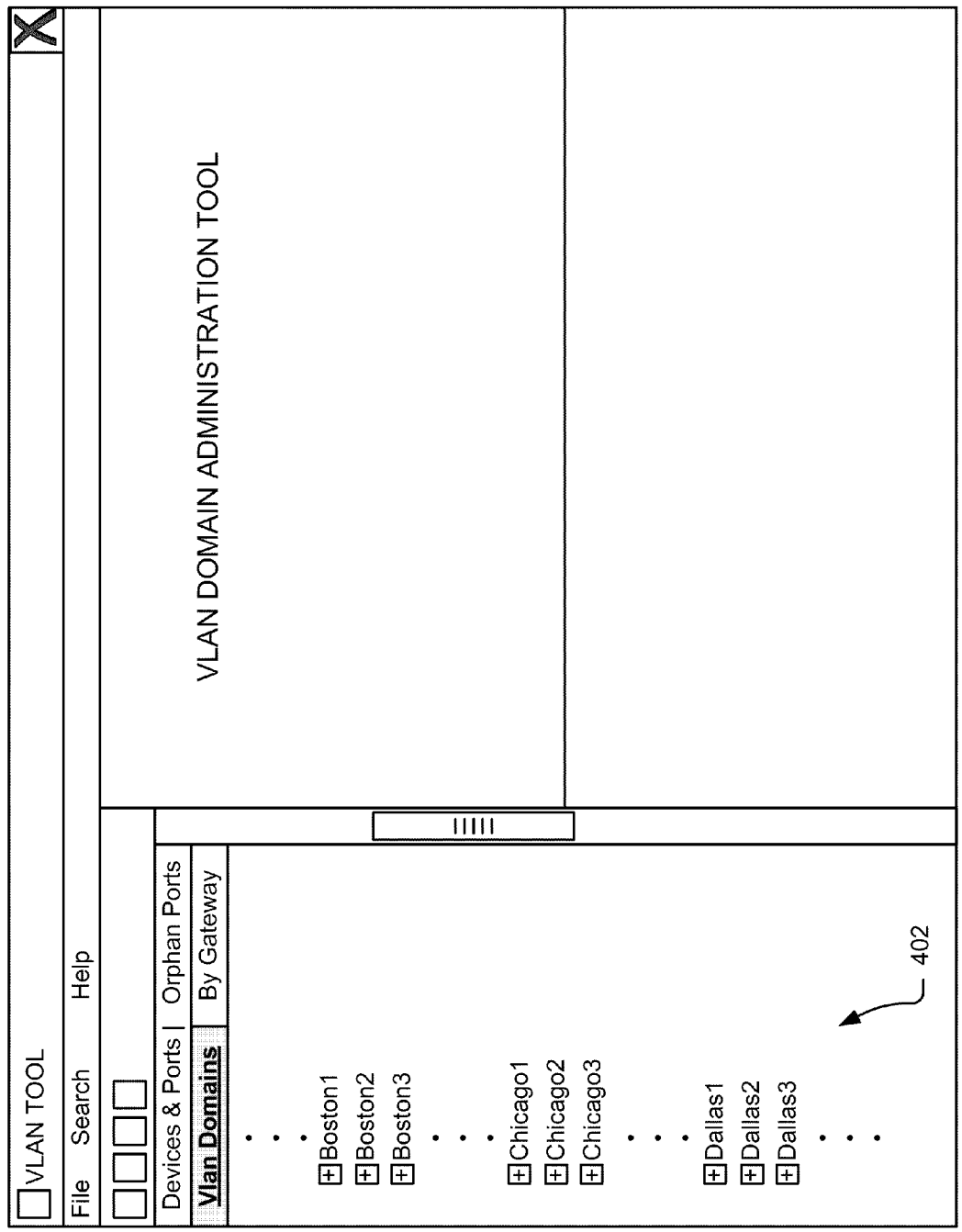
FIGS. 4-9 illustrate exemplary user interfaces for provisioning and managing VLAN domains.

In FIG. 4, for example, a main page VLAN domain administration tool GUI 400 is shown. In the main page VLAN domain administration tool GUI 400 a list 402 of all defined VLAN domains is provided on the left side. Using the main page VLAN domain administration tool GUI 400, a user can navigate and select individual VLAN domains via the list 402. One or more VLAN domains in the list 402 can be expanded to illustrate details of the particular VLAN domains.

Figure 5:
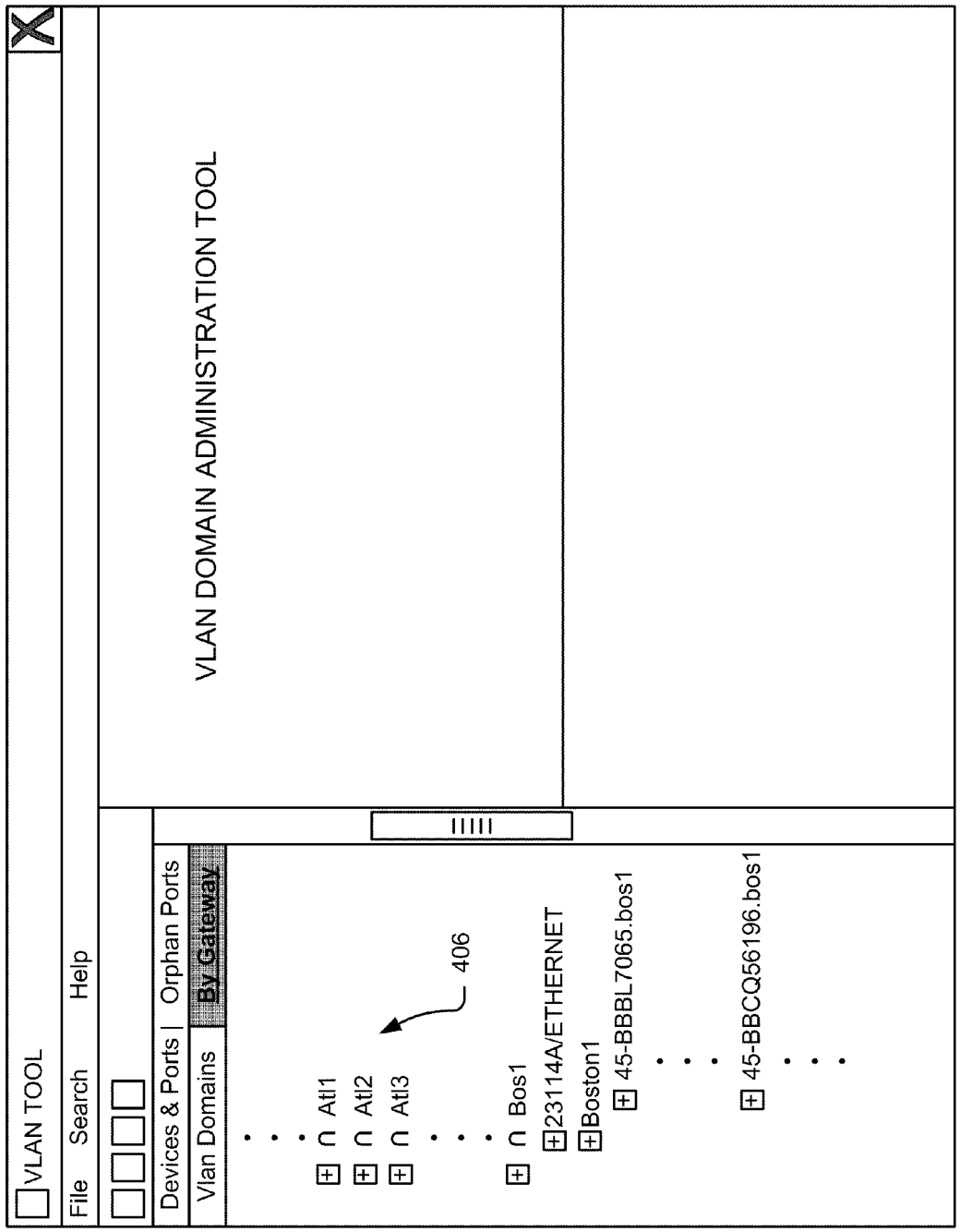

In FIG. 5, an example VLAN domain GUI 404 is provided in which VLAN domains are hierarchically organized by gateways 406 (shown on the left side of GUI 404). In this GUI, a user can access any VLAN domains associated with one or more gateways 406 shown in the list. In one embodiment, for example, a user can expand a particular gateway in the list to show associated VLAN domains. In turn, the user can drill down into the particular VLAN domains as described above with respect to FIG. 4. Expanding a particular VLAN domain associated with a gateway, for example, may reveal individual network devices/elements and their corresponding ports that are assigned to a given VLAN domain.

Figure 6:
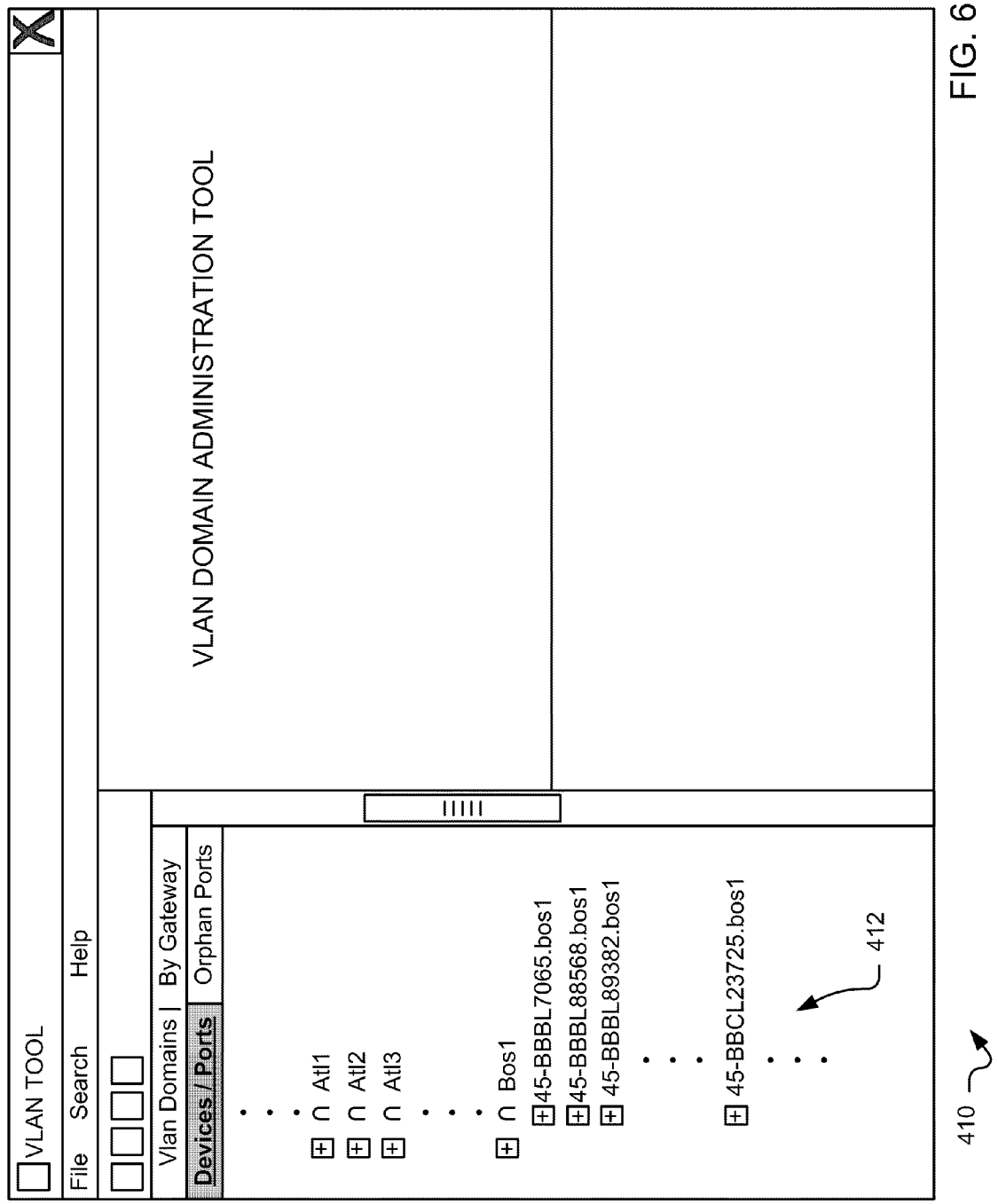

FIG. 6 shows another exemplary VLAN domain administration tool GUI 410 in which a user may search for VLAN domains via a hierarchical list of devices and ports 412. As described above with respect to FIGS. 4 and 5, a user may expand the hierarchical list 412 by selecting a gateway (e.g., bos1) to reveal individual devices and ports located with that gateway. The user may further drill into the list 412 by expanding the list at one or more devices and ports to access VLAN domains associated with a particular device and port.

Figure 7:
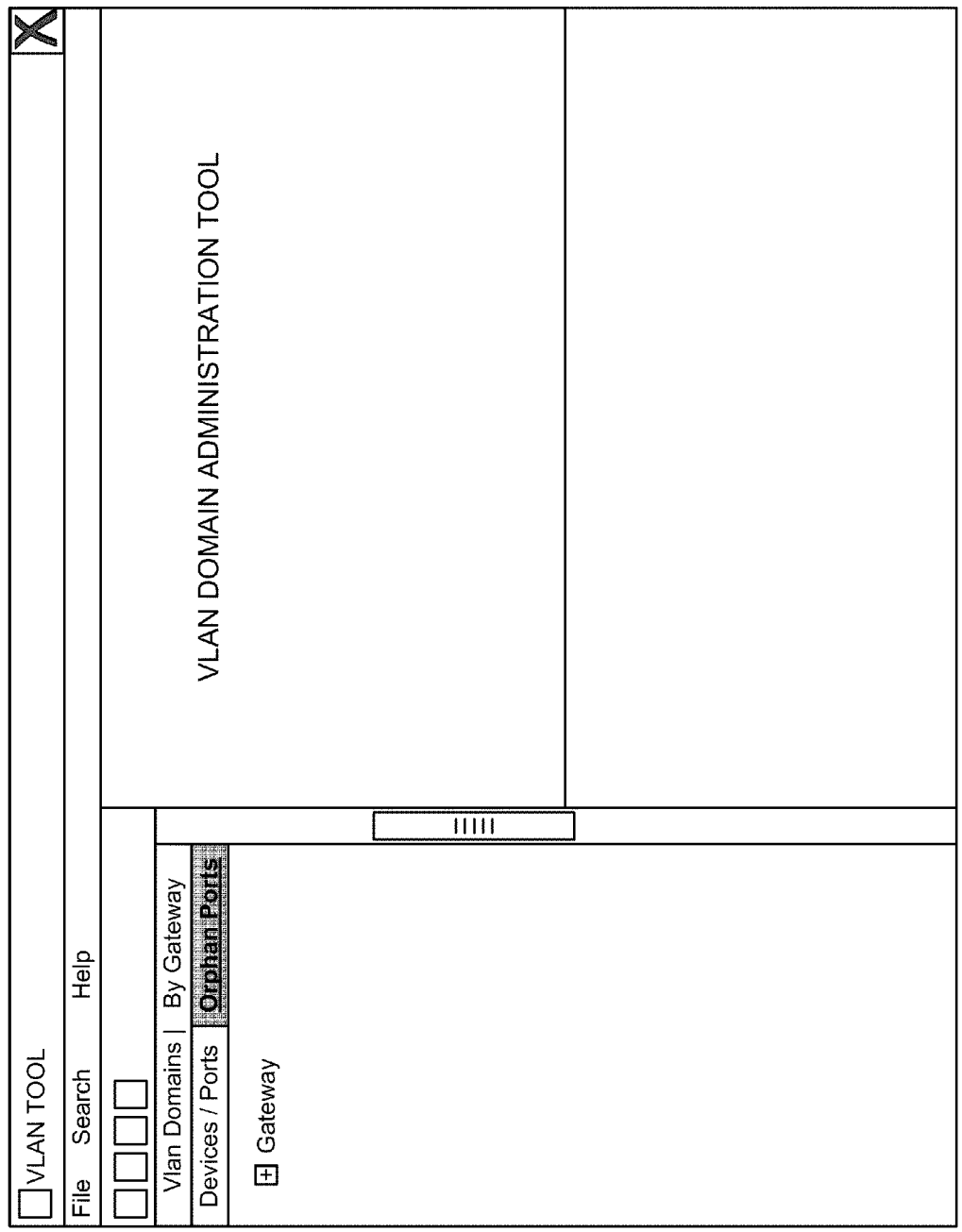

FIG. 7 shows yet another exemplary VLAN domain administration tool GUI 416 in which "orphan ports" can be listed. An orphan port, in one embodiment, comprises a port that is not associated with a VLAN domain.

Figure 8:
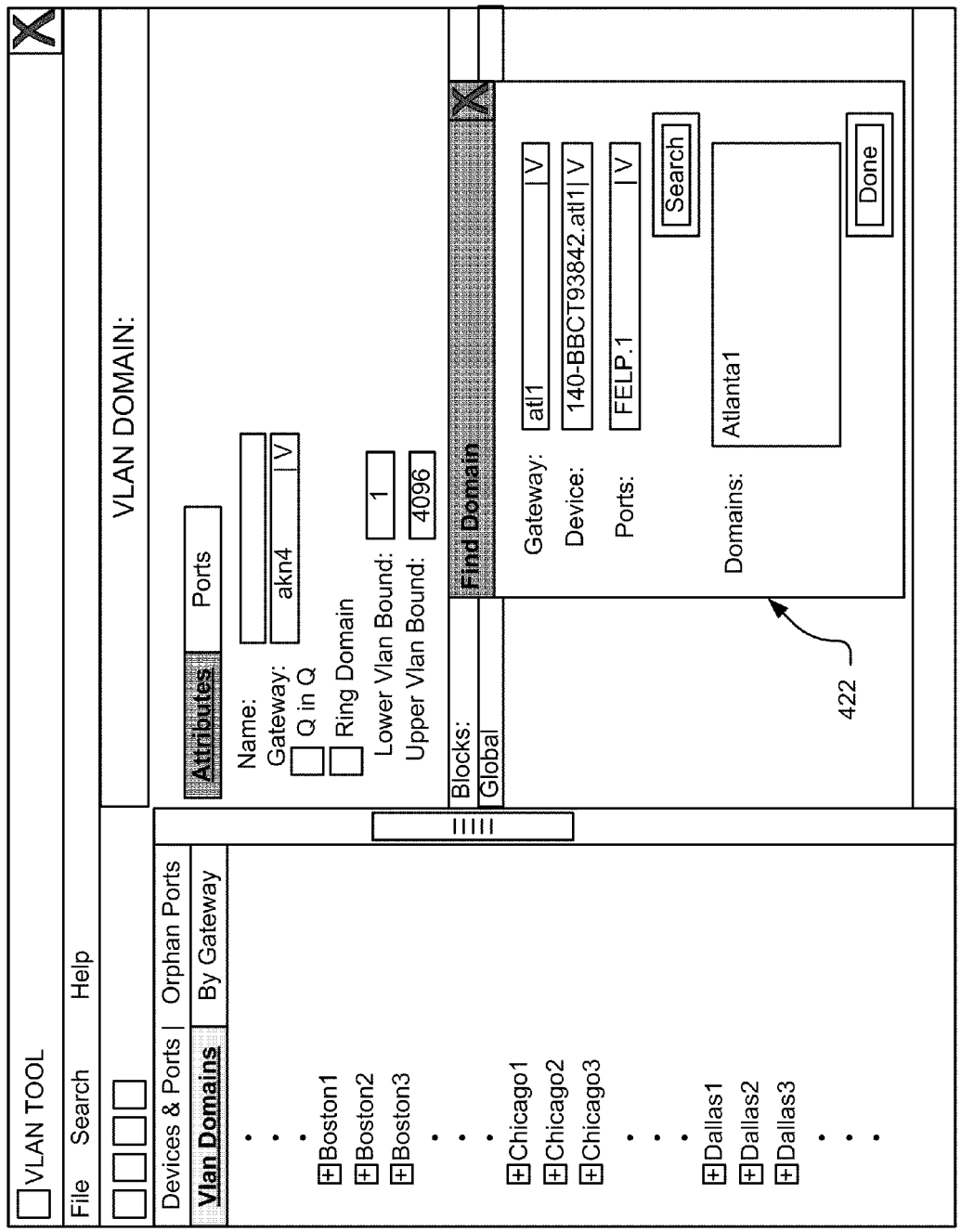

FIG. 8 shows another example VLAN domain administration tool GUI 420 in which a "Find Domain" dialogue search can be performed by entering information into one or more search fields 422 to identify one or more associated VLAN domain.

Figure 9:
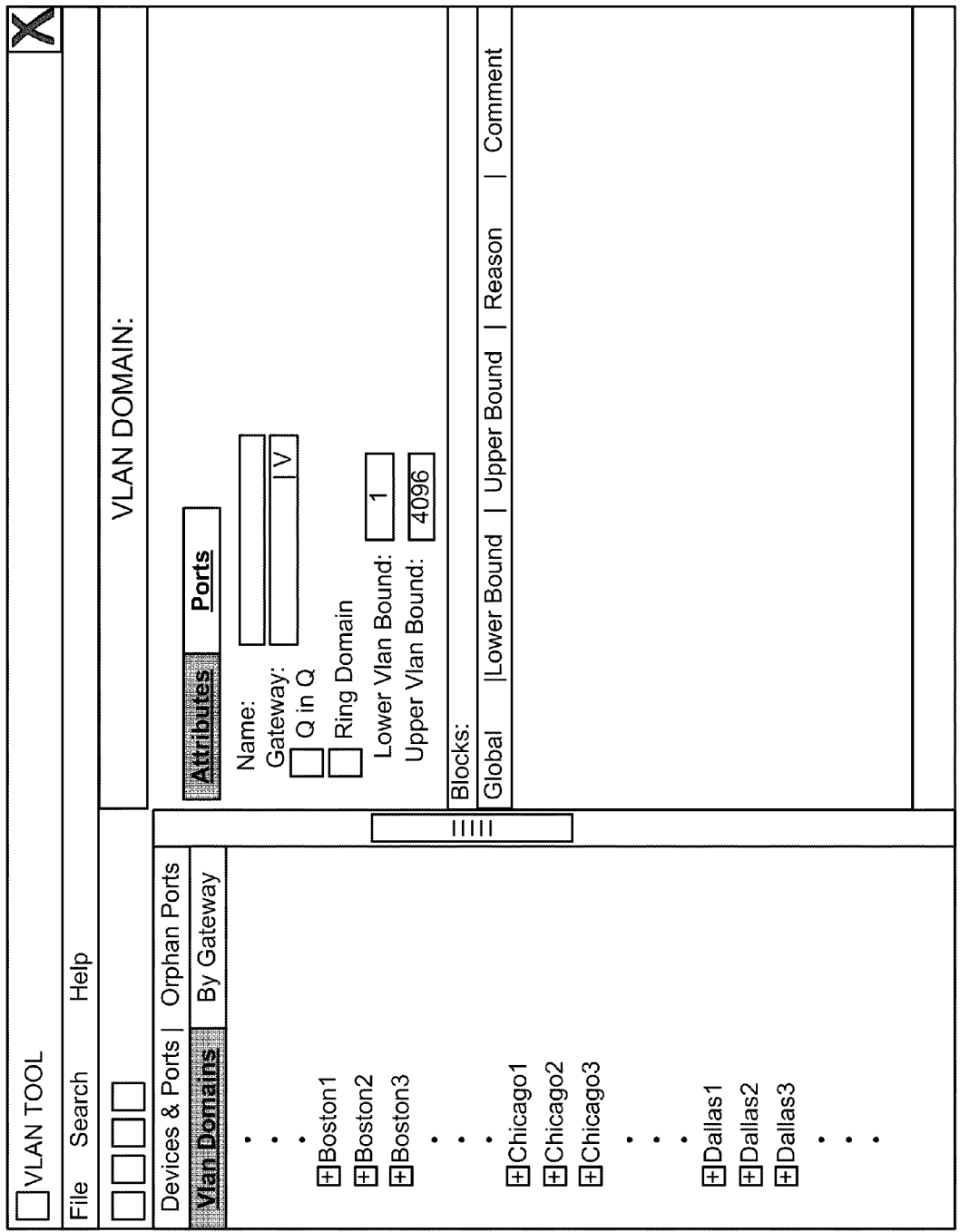

FIG. 9 shows another example VLAN domain administration tool GUI 424 in which a new VLAN domain may be provisioned. In this particular GUI 424, a VLAN domain may be provisioned by entering information in the fields shown (e.g., name, gateway, Q in Q designation, ring domain designation, lower and upper VLAN bounds, blocked VLANs, etc.).

Figure 10:
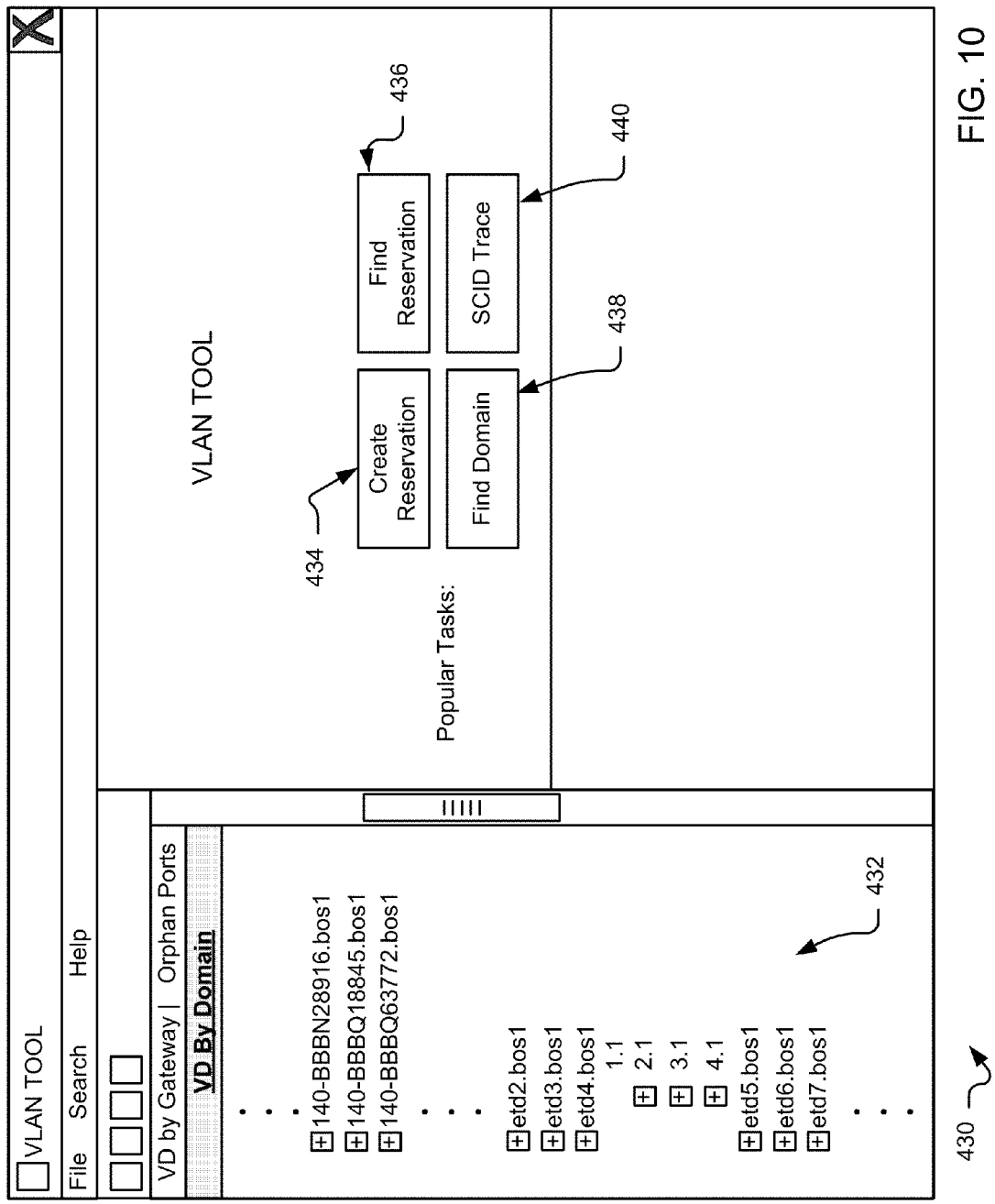

FIG. 10. illustrates an example VLAN tool main page GUI 430. The VLAN tool, for example, may be used to provision, monitor and modify individual VLANs within a VLAN domain. In the example VLAN tool main page GUI 430, for example, a hierarchical list 432 of VLAN domains that may be expanded to show a hierarchical listing of devices and ports at one level and individual VLANs associated with those devices and ports in another level. The GUI 430 further has user-selectable links for creating a VLAN reservation 434, finding a VLAN reservation 436, finding a VLAN domain 438, and performing a customer trace by SCID 440.

FIG. 11 shows an example search result page 444 of the VLAN tool. In this example, the search result page identifies domains, sources, devices, ports, SCID, customers, etc. associated with identified VLANs.

Figure 12:
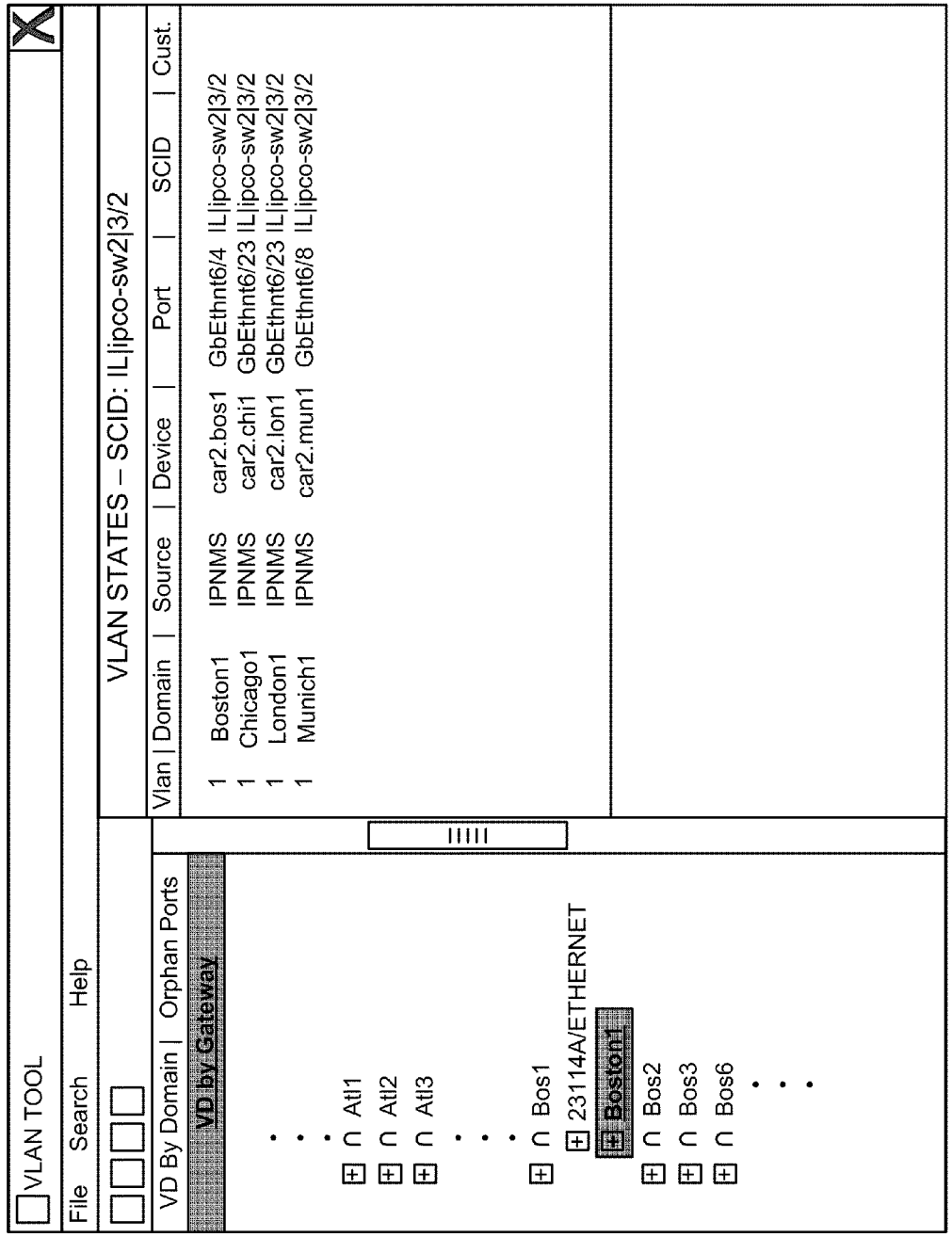

FIG. 12 illustrates an example SCID trace result page 448 in which VLANs associated with an SCID are identified. Again, various characteristics such as domain, device, port, SCID, customer, etc. can be shown for the identified VLANs.

Figure 13:
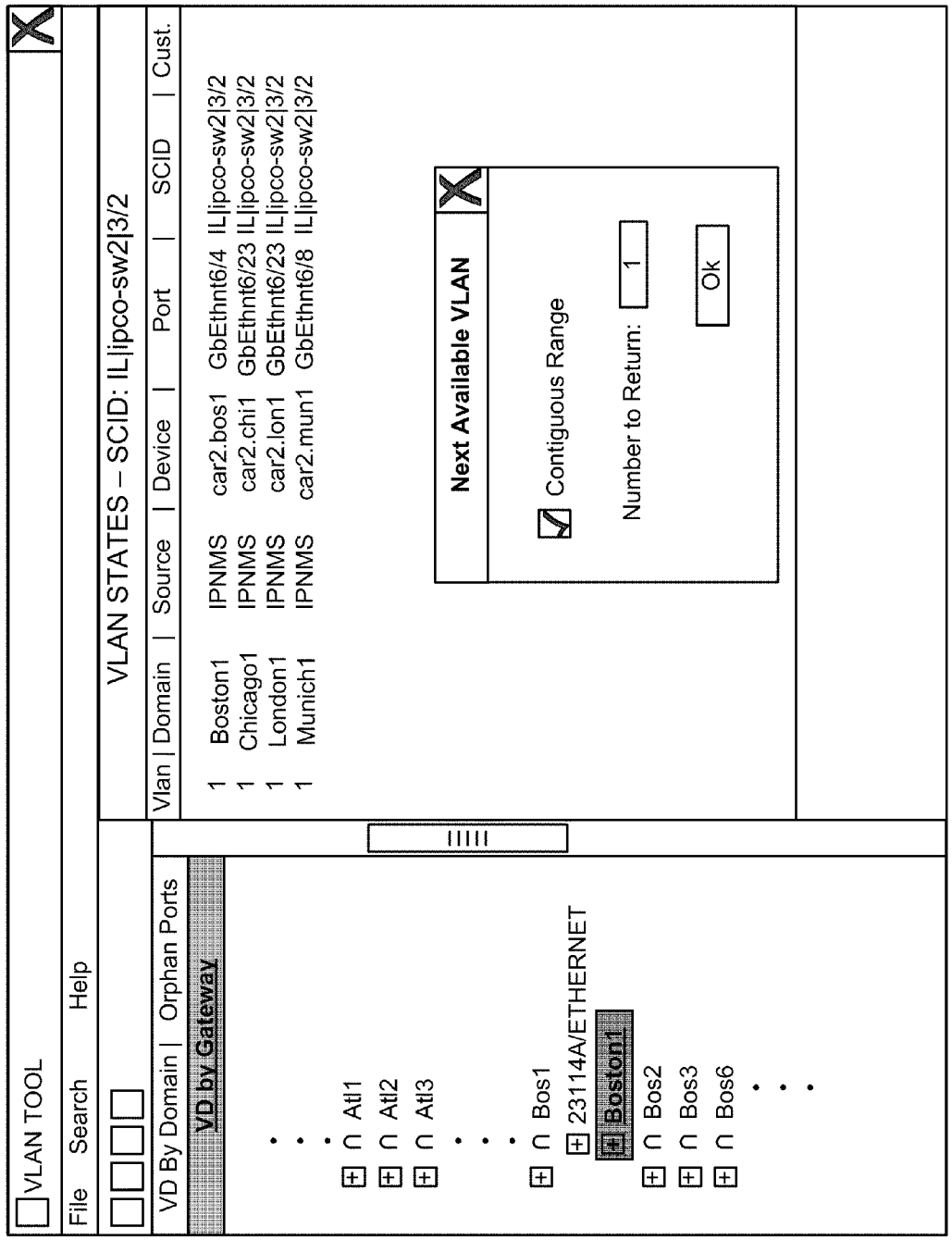
Figure 14:
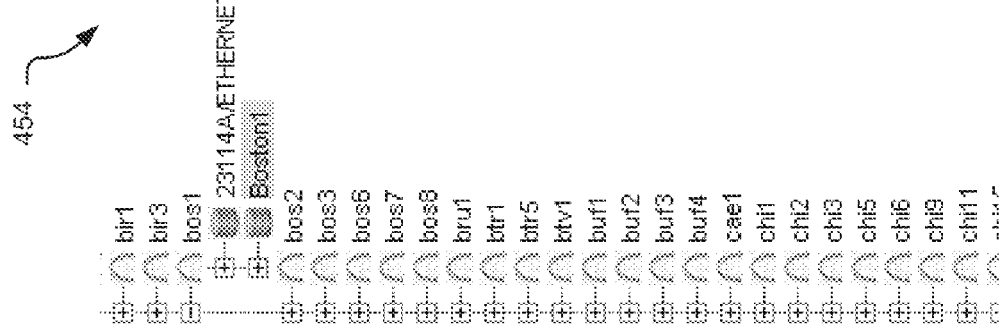

FIG. 13 illustrates another example VLAN tool GUI 450 in which a user can identify one or more additional VLANs available for a VLAN domain. In the example shown in FIG. 13, a user can request one or more available VLANs for a domain and can further request that the identified VLANs be continuous. In FIG. 14, another example VLAN tool GUI 454 identifies the one or more available VLANs (e.g., next available VLAN(s)) for the user in response to a query shown with respect to FIG. 13.

FIG. 15 shows yet another example VLAN tool GUI 460 in which VLAN reservations are shown for a particular VLAN domain. In the GUI 460, for example, a user has expanded gateway "bos1" and selected VLAN domain "Boston1" in panel 462. In response, the GUI 460 shows VLAN reservations 464 for the selected VLAN domain "Boston1." In the GUI 460, for example, the reserved VLANs are identified by a VLAN ID, domain, source, device, port, SCID, and customer.

Figure 16:
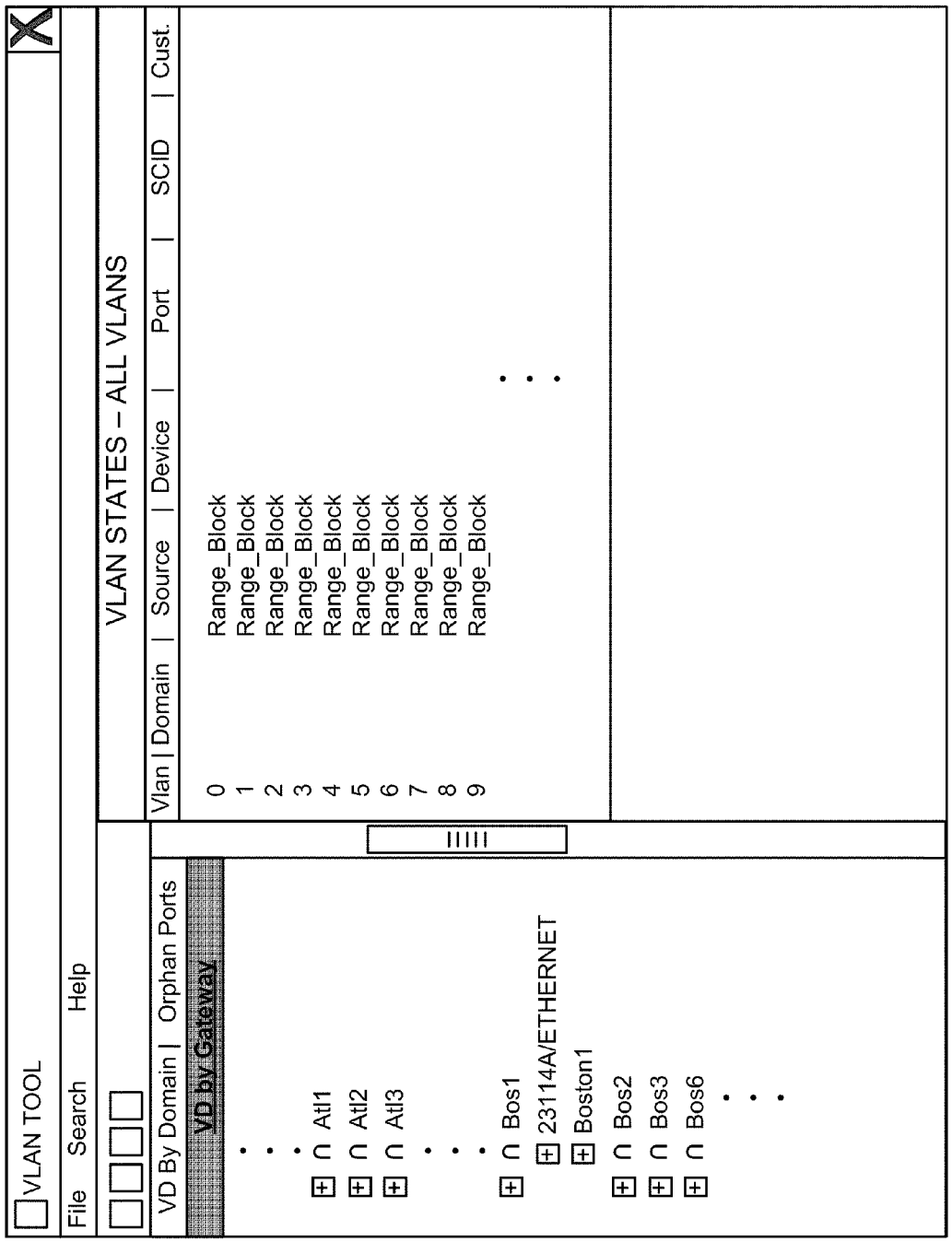

FIG. 16 illustrates another example VLAN tool GUI 470 in which blocked VLANs are shown for a particular domain. In this embodiment, blocked VLANs cannot be provisioned for use within the VLAN domain. These blocked VLANs can be blocked for administrative or management purposes.

FIG. 17 shows yet another example VLAN tool GUI 474 in which errors identified for a particular VLAN domain are shown. The errors, for example, may comprise discrepancies between order and monitoring systems.

Figure 18:
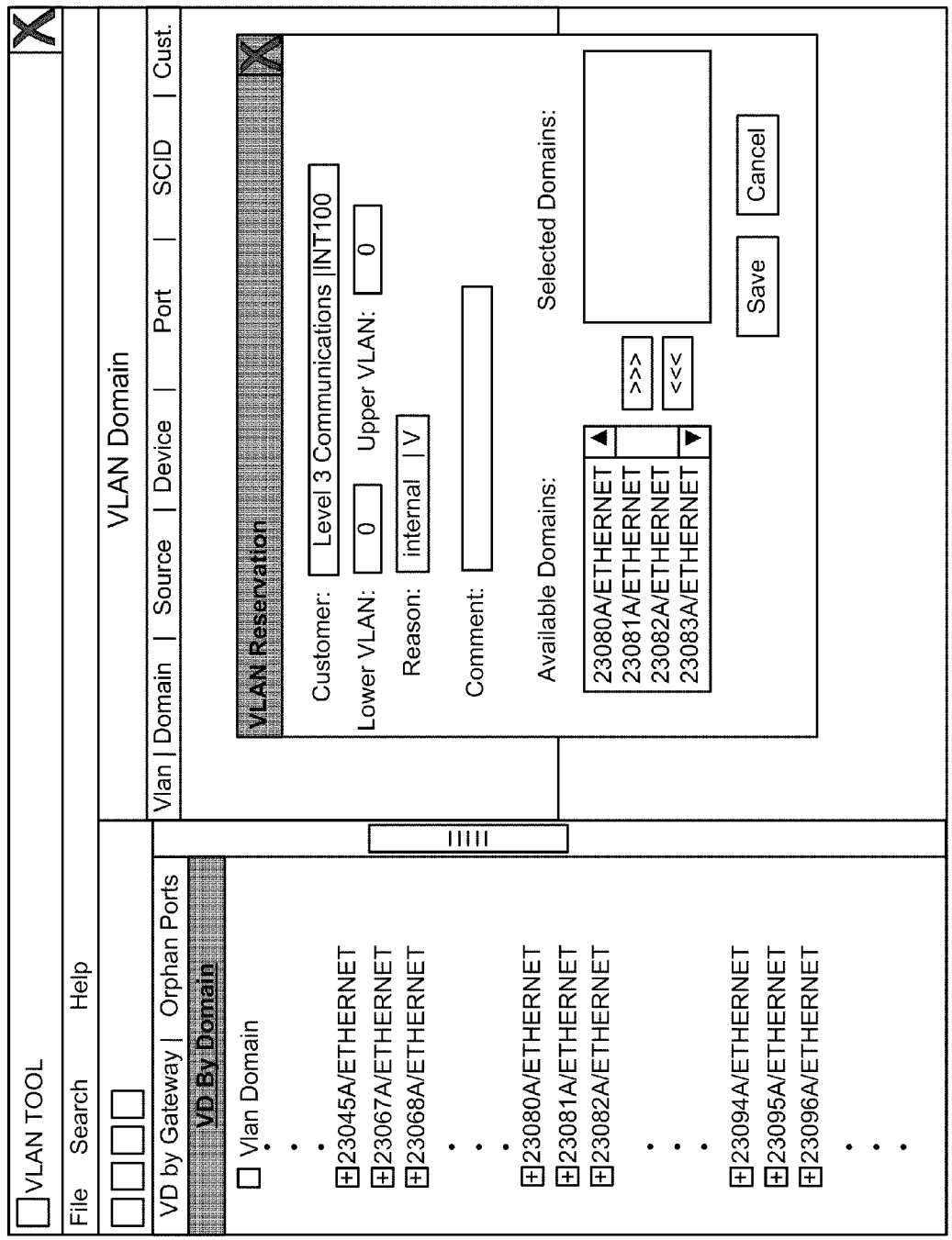
FIGS. 18-20 illustrate exemplary user interfaces for reserving VLANs for a VLAN domain.
Figure 19:
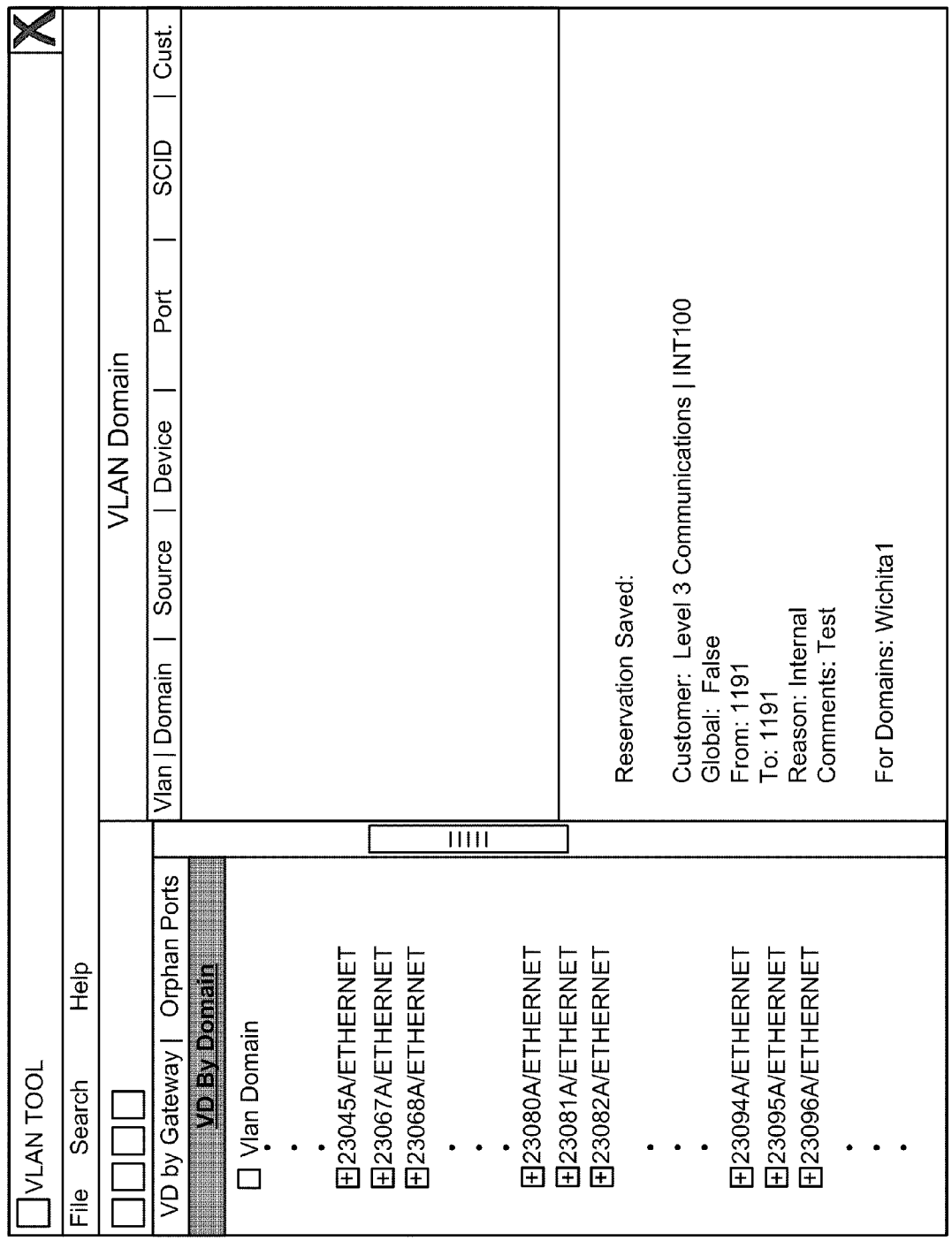

FIG. 18 shows an example VLAN reservation GUI 480 for reserving one or more VLANs for a VLAN domain. In one embodiment, for example, the VLAN reservation GUI 480 may be accessed within the VLAN tool (e.g., via a pull down menu such as File->New->Create Reservation, via a button on the toolbar, via the Create Reservation selector 434 (see FIG. 10), etc.). In the embodiment shown in FIG. 18, for example, one or more VLANs may be reserved for a VLAN domain by entering provisioning information such as a customer identifier, a lower VLAN identifier, an upper VLAN identifier, a reason for the reservation, a comment (e.g., a text field), and one or more selected domains. In FIG. 18, for example, the lower VLAN identifier may identify a lowest value of a possible block of VLANs and the upper VLAN identifier may identify a highest value of the possible block of VLANs. Where a single VLAN is to be reserved, the upper and lower VLAN identifiers may be selected to have the same value. FIG. 19 shows an example reservation confirmation GUI 484 in which the reservation confirmation GUI 484 shows confirmation of a successful reservation and further shows the details of the confirmed reservation.

Figure 20:
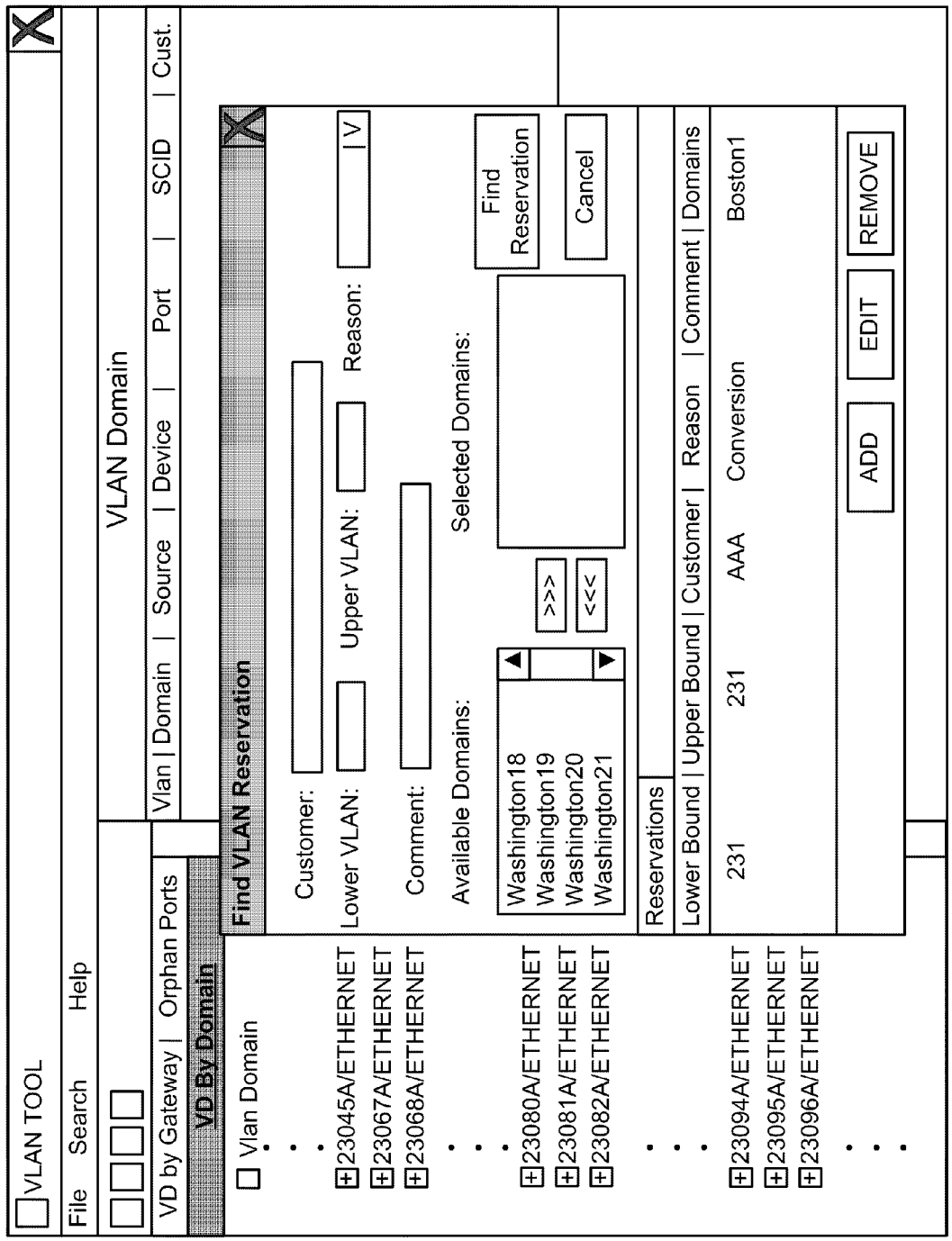

FIG. 20 shows an example find VLAN GUI 488 in which a user may search for one or more VLANs. In one embodiment, for example, the find VLAN GUI 488 may be accessed within the VLAN tool (e.g., via a pull down menu such as Search->Find Reservation, via a button on the toolbar, via the Find Reservation selector 436 (see FIG. 10), etc.). In the embodiment shown in FIG. 20, the find VLAN GUI 488 provides a search screen for finding one or more individual reservations. The search, for example, may be based on the same criteria entered for creating a reservation in FIG. 18 or by entering search information for existing reserved VLANs. In one particular embodiment, the find VLAN GUI 488 may also provide an interface for a user to add, edit or delete a reservation. For example, the find VLAN GUI 488 may provide an interface for linking the user to the VLAN reservation GUI 480 shown in FIG. 18 to create a new reservation, provide an interface for linking the user to the VLAN reservation GUI 480 shown in FIG. 18 with information for the reservation pre-filled out on the interface, or provide an interface for directly or indirectly deleting a reservation of a VLAN.

Exemplary Operations

Table 1 shows an example VLAN domain provisioning data structure associating individual ports with a hypothetical "VLAN Domain A." The data structure shown in Table 1 is merely exemplary, however, and may contain fewer or additional data fields.

TABLE 1

VLAN Domain A
VID [1-4096]
Denver 1
Reservations: Customer, SCID, Notes,
Reason Code, VLAN ID, VLAN ID Range
Ports:

| Device Name | Port Name |
| --- | --- |
| CAR1.Den1 | 1/1 |
| CAR1.Den1 | 1/2 |
| CAR1.Den1 | 1/3 |
| CAR2.Den1 | 2/1 |
| CAR2.Den1 | 2/2 |
| CAR2.Den1 | 2/3 |

In the example shown in Table 1, VLAN Domain A has an identifier of "Denver 1" and supports a range of VLAN IDs to be assigned to the domain (e.g., from 1 to 4096). The VLAN domain may be reserved using the Reservation fields. In this particular embodiment, for example, a reservation may identify the VLAN domain as being assigned to a customer, an SCID, may include notes, a Reason Code, or may identify a single VLAN ID or a range of VLAN IDs. In addition, VLAN Domain A is associated with a list of ports, such as the ports listed for devices CAR1.Den1 and CAR2.Den1. As described above, a VLAN domain may be defined by ports that are communicatively coupled to one another. Individual VLANs associated with one or more of those ports may then be associated with the VLAN domain.

Table 2 shows a list of "consumed" VLANs for a particular VLAN domain, in this case VLAN Domain A shown above in Table 1.

TABLE 2

| VLAN Domain A | | | |
| --- | --- | --- | --- |
| VLAN# | SCID | DEVICE | PORT |
| 100 | J | CAR1.Den1 | 1/1 |
| 101 | K | CAR1.Den1 | 1/2 |
| 102 | L | CAR1.Den1 | 1/3 |
| 103 | M | CAR2.Den1 | 2/1 |
| 104 | N | CAR2.Den1 | 2/2 |
| 105 | O | CAR2.Den1 | 2/3 |

In Table 2, for example, VLAN numbers 100-105 are "consumed" and assigned to the devices and ports shown above. If another port is to be added to VLAN Domain A, the next available VLAN (e.g., 106) may be assigned to the particular port.

Figure 21:
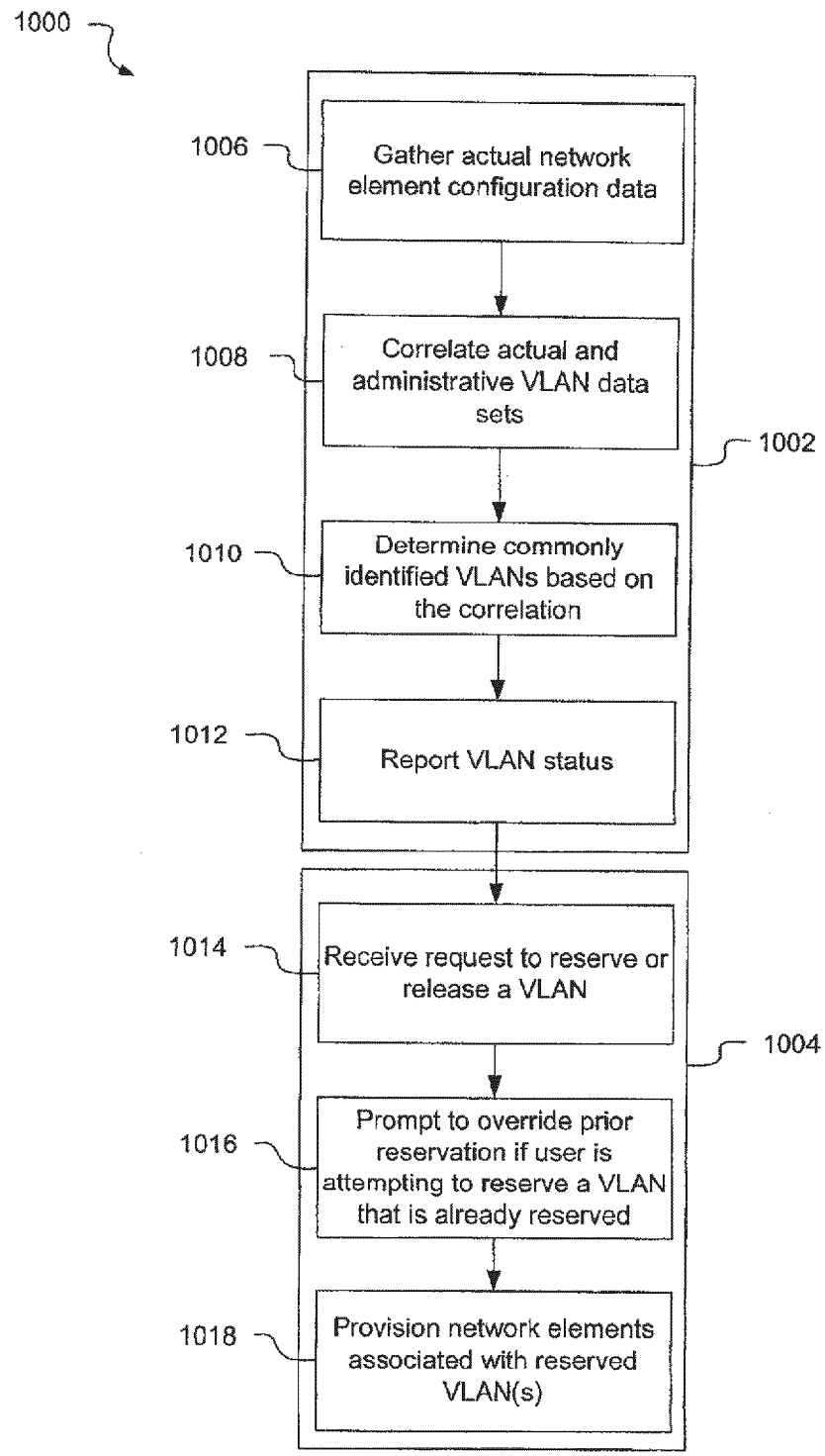
FIGS. 21-22 are flowcharts illustrating example operations of an embodiment of a VLAN domain management system.
Figure 22:
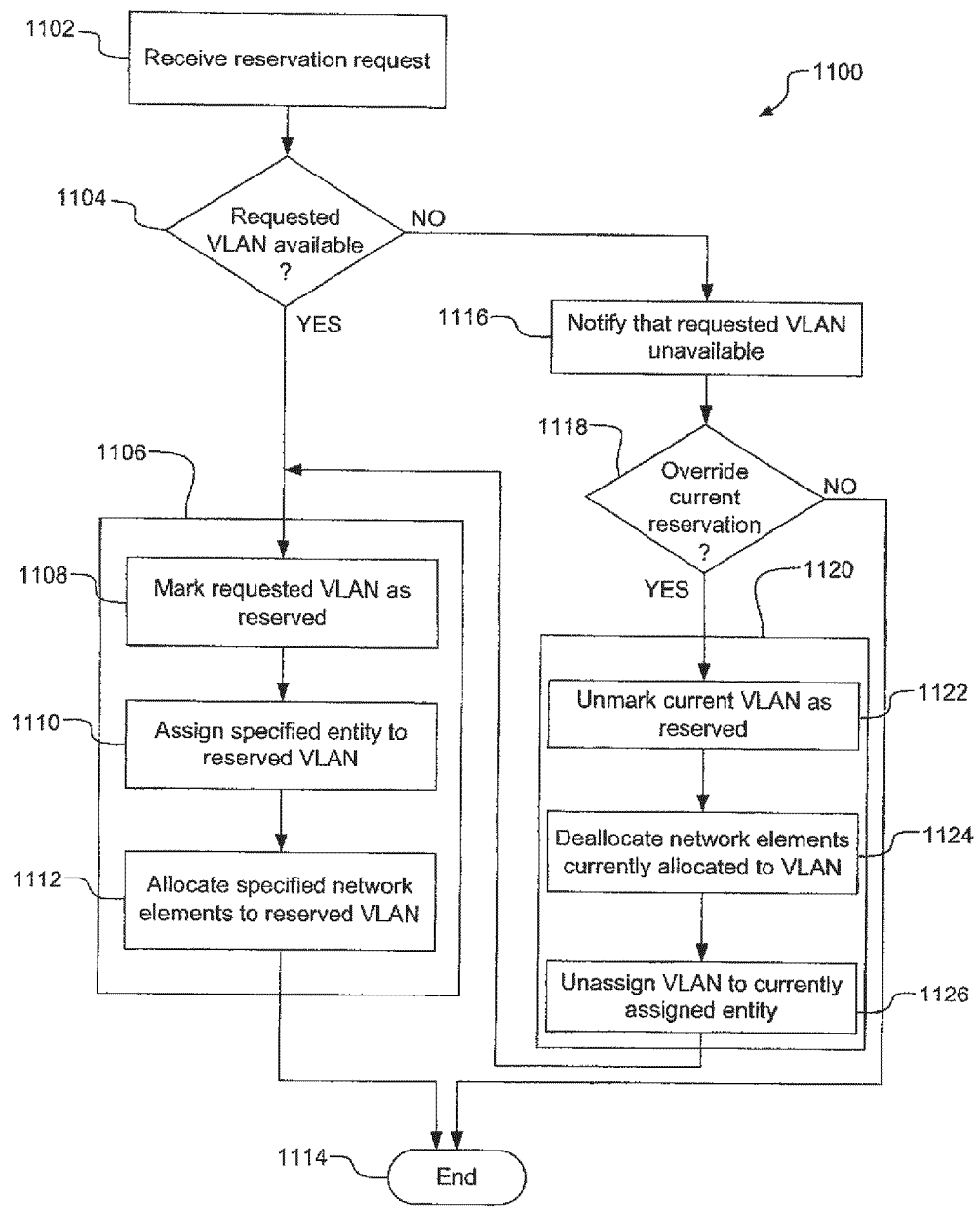

FIGS. 21-22 are flowcharts illustrating example operations of an embodiment of a VLAN domain management system. In this embodiment, for example, the operations provision, identify, report and reserve a VLAN domain. In an example embodiment illustrated in FIG. 21, for example, a flowchart illustrates an embodiment of a VLAN domain management algorithm 1000. The algorithms 1000 of FIGS. 21 and 1100 of FIG. 22 may be used in conjunction or independently. The order of operations is not limited to that shown in FIGS. 21-22, unless a particular order is necessary. The algorithms 1000 and 1100 can be carried out with a VLAN domain management system, such as the one shown in FIG. 2 and described above. However, the algorithms 1000 and 1100 can alternatively be carried out on other systems.

The algorithm 1000 comprises a reservation and releasing algorithm 1000 and can be viewed as including two sub-algorithms or processes: an identifying and reporting process 1002 and a reserving, releasing and provisioning algorithm 1004. In the identifying and reporting process 1002, a gathering operation 1006 gathers network element configuration data from network elements operating on the network for a provisioned VLAN domain (e.g., VLAN Domain A shown in Table 1 above). In one embodiment, the gathering operation 1006 polls one or more network elements for actual configuration settings, such as a VLAN they are allocated to, IP addresses, network element identifiers, etc. The gathering operation 1002 stores the gathered VLAN data in a data store where it can be retrieved for analysis.

A correlating operation 1008 correlates the actual network element configuration data gathered in gathering operation 1006 with one or more sets of administrative VLAN data. Correlating generally involves mapping same data types across two or more data sets for an associated parameter. For example, VLAN identifier data types in the actual network element configuration data may be mapped to VLAN identifier types in an administrative VLAN provisioning data set for a logical site. As another example, service component IDs may be mapped between two data sets for a VLAN in a logical site. As yet another example, VLAN IDs may be mapped two each other for a given network element identified in two data sets.

The correlating operation 1008 may involve neutralizing one or more sets of data to put them into a neutral format so that the data sets are in a common form to enable comparison across different data stores. One embodiment of data neutralization includes generating Java objects based on data objects in SQL, Oracle or other databases.

A determining operation 1010 determines whether the data in the correlated data types is common or not across two or more data sets. Common data is data that is consistent between two or more data sets. For example, if the actual network element configuration data indicates a particular network element is allocated to VLAN 172 in London and the administrative configuration generation data set indicates that VLAN 172 in London includes that particular network element, then the VLAN/logical site pair for that network element is common between the two data sets. Data that is not commonly identified between two data sets is data that is inconsistent between the two data sets. For example, if an administrative provisioning data set indicates that VLAN 556 in Miami is assigned to a company named First Pseudoname Networks.com but an orders administrative data set indicates that VLAN 556 in Miami is assigned to a company named Second Pseudoname Networks.com, then the assigned entity is not commonly identified (i.e., is inconsistent) between the two data sets for VLAN 556 in Miami. Accordingly, by way of example, the determining operation 1010 may involve comparing a VLAN identifier actually allocated to a given network element with a VLAN identifier (if any) associated with the given network element in the provisioning data set or configuration generation data set. The determining operation 1010 may also compare service component IDs between two or more sets of VLAN administrative data to determine whether a given VLAN (at a specified logical site) has been associated with different service components in different VLAN administrative data sets.

Table 3, for example, shows a result of a correlation operation in which a single VLAN number is associated with different SCIDs within the same VLAN domain, VLAN Domain A.

TABLE 3

VLAN Domain A

| VLAN# | SCID | DEVICE | PORT |
|---|---|---|---|
| 100 | J | CAR1.Den1 | 1/1 |
| 101 | K | CAR1.Den1 | 1/2 |
| 101 | P | CAR1.Den1 | 1/2 |
| 102 | L | CAR1.Den1 | 1/3 |
| 103 | M | CAR2.Den1 | 2/1 |
| 104 | N | CAR2.Den1 | 2/2 |
| 105 | O | CAR2.Den1 | 2/3 |

As shown in Table 3, VLAN number 101 is associated in different data stores with SCID "K" and SCID "P." In this embodiment, a discrepancy such as for VLAN 101 of VLAN Domain A may be flagged as an error to alert a user of the discrepancy between the data stores.

A reporting operation 1012 reports the VLAN status. In one embodiment the reporting operation presents one or more tables on a computer monitor, displaying status information for VLANs of one or more VLAN domains, such as shown in Table 3. VLAN status can indicate whether VLANs were commonly identified across two or more sets of VLAN data (e.g., actual configuration data or administratively VLAN data) and/or whether VLANs were inconsistently identified in the different sets of VLAN data. For example, when the VLANs are commonly identified across all the data sets, the status is indicated as "OK" or "VALID"; whereas, if the VLANs are not commonly shown in the data sets then the status indicated would be "INVALID" or "ERROR". VLANs that are shown as being reserved (e.g., in the VLAN provisioning data store) may be marked as "RESERVED". The reporting operation 1012 may also color code the VLAN status indicators (e.g., red for ERROR, green for OK, or yellow for RESERVED).

In the reserving process 1004, a receiving operation 1014 receives a request to reserve or release a VLAN. The receiving operation 1014 may involve the user selecting (e.g., clicking on) a VLAN/Logical site pair. In one embodiment, the user can select multiple VLANs using an input device; e.g., while holding down the control (Ctrl) button on the keyboard, clicking with the mouse on multiple VLAN IDs. The receiving operation 1014 receives a VID and a logical site identifier that was selected by the user. In a prompting operation 1016, if the same VLAN/Logical site was previously reserved, the user is prompted to override the previous reservation. Of course, if there was no previous reservation (i.e., the selected VLAN/Logical Site is available), the prompting operation 1016 will not occur. In a provisioning operation 1018, network elements allocated to the selected VLAN at the logical site are provisioned. The provisioning operation 1018 may happen at some arbitrary or specified time after the VLAN is reserved. As part of the provisioning operation, the allocated network elements are configured to carry communications traffic associated with the reserved VLAN. Provisioning may occur automatically, manually, remotely or locally, or any combination thereof.

Turning to FIG. 19, the reserving and releasing algorithm 1100 generally reserves or releases VLANs within a VLAN domain in response to user input. In a receiving operation 1102, a reservation request is received to reserve a specified VLAN for a specified VLAN domain (e.g., VLAN Domain A). A querying operation 1104 determines whether the specified VLAN is available for the ports associated with the VLAN domain. In some embodiments the querying operation 1104 involves querying a data store, such as an SQL or Oracle database, to determine if the specified VLAN has been reserved. If the specified VLAN is available, the algorithm 1100 branches "YES" to a reserving operation 1106.

The reserving operation 1106 includes a marking operation 1108, an assigning operation 1110 and an allocating operation 1112. In the marking operation 1108, the specified VLAN associated with the VLAN domain is marked as reserved. The marking operation 1108 involves storing a "reserved" indicator (e.g., a flag, bit setting) in association with the specified VLAN ID in a provisioning data store for the associated VLAN domain. The assigning operation 1110 assigns the specified VLAN to a specified entity (e.g., a business organization). The assigning operation 1110 may involve prompting the user for, and receiving from the user, an entity identifier, such as a company name. The assigning operation 1110 stores the entity identifier in association with the reserved VLAN ID in the provisioning data store.

The allocating operation 1112 allocates specified network elements to the reserved VLAN. The allocating operation 1112 may prompt the user to indicate which network elements are to be allocated. The allocating operation 1112 may then store network element identifiers in association with the specified VLAN ID in the provisioning data store. Alternatively or in addition, the allocating operation 1112 may mark network element identifier fields in a network element data store as being allocated to the reserved VLAN. After the network elements are allocated, the algorithm 1100 ends at end operation 1114.

Returning to the querying operation 1104, if it is determined that the requested VLAN is not available (i.e., has been previously reserved), the algorithm 1100 branches "NO" to a notifying operation 1116. The notifying operation 1116 notifies the requesting user that the specified VLAN is unavailable and prompts the user to either override the current reservation or not. (In some embodiments, however, a VLAN may be blocked from being overridden.) Another querying operation 1118 determines whether the current VLAN reservation should be overridden. The querying operation 1118 received input from the user indicating whether to override the previous reservation. If the input indicates that the reservation should not be overridden, the algorithm 1100 branches "NO" to the end operation 1114.

If, on the other hand, the previous reservation is to be overridden, the algorithm 1100 branches "YES" to a releasing operation 1120. The releasing operation 1120 includes an unmarking operation 1122, deallocating operation 1124 and unassigning operation 1126. The unmarking operation 1122 unmarks the previously marked VLAN ID; i.e., the unmarking operation 1122 removes the reservation indicator associated with the VLAN ID in the provisioning data store. The deallocating operation 1124 deallocates any network elements that were previously allocated to the specified VLAN. Deallocating operation 1124 essentially performs the opposite process as that of the allocating operation 1112; e.g., the deallocating operation 1124 may unmark network element IDs as reserved in the provisioning data store. The unassigning operation 1126 reverses the assigning operation 1110, whereby the entity identifier is no longer associated with the specified VLAN ID.

Exemplary Computing Device

Figure 23:
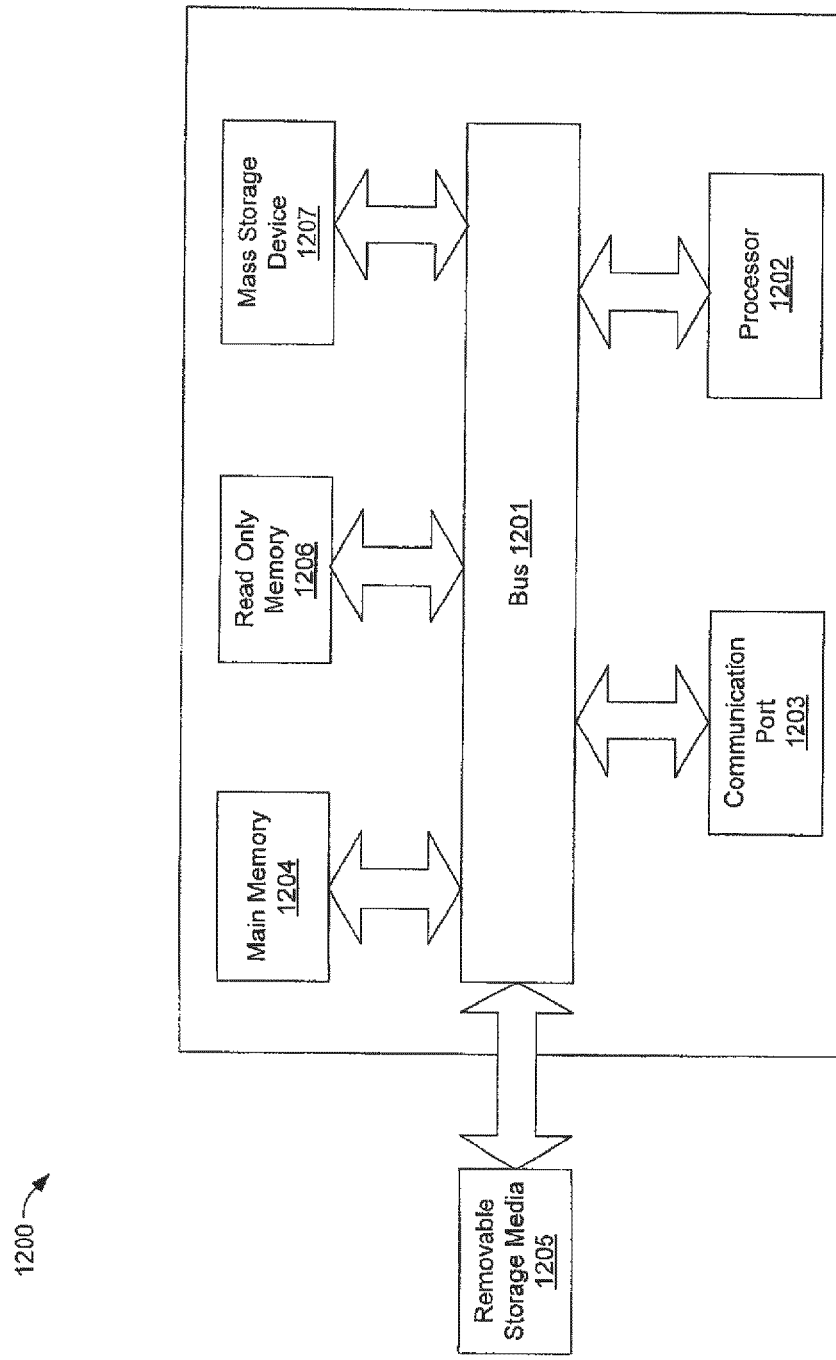
FIG. 23 illustrates a general purpose computing device upon which one or more aspects of embodiments of a VLAN management system may be implemented.

FIG. 23 is a schematic diagram of a computing device 1200 upon which embodiments of the VLAN management system and/or other modules and processes may be implemented and carried out. As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

According to the present example, the computing device 1200 includes a bus 1201, at least one processor 1202, at least one communication port 1203, a main memory 1204, a removable storage media 1205, a read only memory 1206, and a mass storage 1207. Processor(s) 1202 can be any know processor, such as, but not limited to, an Intel® Itanium® or Itanium 2® processor(s), AMD® Opteron® or Athion MP® processor(s), or Motorola® lines of processors. Communication port(s) 1203 can be any of an RS-232 port for use with a modem based dialup connection, a 10/100 Ethernet port, a Gigabit port using copper or fiber, or a USB port. Communication port(s) 1203 may be chosen depending on a network such a Local Area Network (LAN), Wide Area Network (WAN), or any network to which the computing device 1200 connects. The computing device 1200 may be in communication with peripheral devices (not shown) such as, but not limited to, printers, speakers, cameras, microphones, or scanners.

Main memory 1204 can be Random Access Memory (RAM), or any other dynamic storage device(s) commonly known in the art. Read only memory 1206 can be any static storage device(s) such as Programmable Read Only Memory (PROM) chips for storing static information such as instructions for processor 1202. Mass storage 1207 can be used to store information and instructions. For example, hard disks such as the Adaptec® family of SCSI drives, an optical disc, an array of disks such as RAID, such as the Adaptec family of RAID drives, or any other mass storage devices may be used.

Bus 1201 communicatively couples processor(s) 1202 with the other memory, storage and communication blocks. Bus 1201 can be a PCI/PCI-X, SCSI, or USB based system bus (or other) depending on the storage devices used. Removable storage media 1205 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

In the foregoing description, numerous specific details are set forth in order to provide a thorough understanding of embodiments of the present invention. It will be apparent, however, to one skilled in the art that embodiments of the present invention may be practiced without some of these specific details. Embodiments of the present invention include various steps, which are described in this specification. The steps may be performed by hardware components or may be embodied in machine-executable (e.g., computer-executable) instructions, which may be used to cause a general-purpose or special-purpose processor programmed with the instructions to perform the steps. Alternatively, the steps may be performed by a combination of hardware, software and/or firmware.

Embodiments of the present invention may be provided as a computer program product, which may include a machine-readable or computer-readable medium having instructions stored thereon, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A computer-implemented method of managing a virtual local area network (VLAN) domain associated with a network, the method comprising:
    defining a VLAN domain comprising a list of a plurality of connectively coupled ports of the network associated with the VLAN domain;
    assigning, to the VLAN domain, at least one VLAN associated with the plurality of connectively coupled ports;
    querying a plurality of network elements in the network to request actual network element configuration data of a first object type, wherein the actual network element configuration data identifies one or more VLANs to which at least some of the plurality of network elements are allocated according to configurations observed at the at least some of the plurality of network elements;
    correlating the actual network element configuration data with administrative VLAN data of a second object type to identify one or more VLANs that are not commonly identified in both the actual network element configuration data and the administrative VLAN data within the defined VLAN domain, wherein the administrative VLAN data is business data stored during the administration of VLANs in the network, wherein correlating comprises generating administrative VLAN data of the first object type based on the administrative VLAN data of the second object type; and
    based on the correlation, reporting a status of the identified one or more VLANs.

2. The computer-implemented method of claim 1 wherein the operation of reporting further comprises indicating one or more VLANs commonly identified in both the administrative VLAN data and the actual network element configuration data.

3. The computer-implemented method of claim 1 wherein the operation of reporting further comprises reporting one or more VLANs identified for each of a plurality of VLAN domains.

4. The computer-implemented method of claim 1 wherein gathering actual network element configuration data comprises polling the plurality of network elements for specified configuration data.

5. The computer-implemented method of claim 1, wherein gathering actual network element configuration data comprises gathering the actual network element configuration data from network elements at a plurality of logical sites.

6. The computer-implemented method of claim 1 wherein the administrative VLAN data of the second object type comprises data related to VLANs that have been ordered.

7. The computer-implemented method of claim 1 wherein the administrative VLAN data of the second object type comprises data related to VLANs that have been provisioned within the VLAN domain.

8. The computer-implemented method of claim 1 wherein the administrative VLAN data of the second object type comprises data comprises data related to network element configurations.

9. The computer-implemented method of claim 1 wherein correlating further comprises:
    identifying a data field of the actual network element configuration data equivalent to a data field of the administrative VLAN data; and
    mapping the data field of the actual network element configuration data to the data field of the administrative VLAN data.

10. A system for managing virtual local area networks (VLANs) in a network, the system comprising:
    a network provisioning module for defining a VLAN domain comprising a list of a plurality of connectively coupled ports of the network associated with the VLAN domain and assigning, to the VLAN domain, at least one VLAN associated with the plurality of connectively coupled ports;
    a network monitoring system operable to gather actual network element configuration data of a first object type from a plurality of network elements associated with one or more VLAN domains, wherein the actual network element configuration data identifies one or more VLANs that at least some of the plurality of network elements are allocated to according to configurations observed at the at least some of the plurality of network elements; and
    a VLAN services module operable to correlate, for each one of the identified VLANs, the actual network element configuration data of the identified VLAN with administrative VLAN data of a second object type of the identified VLAN, wherein the administrative VLAN data is business data stored during the administration of VLANs in the network, and further operable to determine that one or more of the identified VLANs is not commonly identified in both the actual network element configuration data and the administrative VLAN data, wherein the VLAN services module is further operable to generate administrative VLAN data of the first object type based on administrative VLAN data of the second object type.

11. The system of claim 10 further comprising a VLAN management user interface operable to report VLAN status determined by the VLAN services module.

12. The system of claim 11 wherein the VLAN management user interface is further operable to issue a notification that a VLAN is reserved.

13. The system of claim 11 wherein the VLAN management user interface is further operable to receive a reservation request to reserve a specified VLAN.

14. The system of claim 13 wherein the VLAN services modules is further operable to reserve the specified VLAN by marking the VLAN as reserved, assign the specified VLAN to VLAN domain, and allocate one or more specified network elements to the specified VLAN of the VLAN domain.

15. The system of claim 13 wherein the VLAN management user interface is further configured to receive a release request to release a specified VLAN that is currently reserved, and wherein the VLAN management services module is further operable to responsively release the specified VLAN.

16. The system of claim 11 wherein the VLAN management user interface is further operable to simultaneously present VLAN status of VLANs for multiple VLAN domains.

17. The system of claim 16 wherein the VLAN management user interface is further operable to enable a user to specify the multiple VLAN domains.

18. The system of claim 10 further comprising:
a VLAN orders data store including data related to VLANs that have been ordered;
a VLAN provisioning data store including data related to VLANs that have been provisioned within the VLAN domain;
a configuration generation data store storing data related to network element configurations; and
wherein the VLAN network services module is operable to correlate data from the VLAN orders data store, the VLAN provisioning data store and the configuration generation data store.

19. The system of claim 10 wherein the VLAN services module is further operable to:
identify a data field of the actual network element configuration data equivalent to a data field of the administrative VLAN data; and
map the data field of the actual network element configuration data to the data field of the administrative VLAN data.

* * * * *